(12) United States Patent
Uefuji

(10) Patent No.: US 9,378,248 B2
(45) Date of Patent: Jun. 28, 2016

(54) RETRIEVAL APPARATUS, RETRIEVAL METHOD, AND COMPUTER-READABLE RECORDING MEDIUM

(71) Applicant: Yasuhisa Uefuji, Tokyo (JP)

(72) Inventor: Yasuhisa Uefuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 72 days.

(21) Appl. No.: 13/793,779

(22) Filed: Mar. 11, 2013

(65) Prior Publication Data

US 2013/0246403 A1 Sep. 19, 2013

(30) Foreign Application Priority Data

Mar. 13, 2012 (JP) ................................. 2012-056378

(51) Int. Cl.
*G06F 17/30* (2006.01)
(52) U.S. Cl.
CPC ...... *G06F 17/3053* (2013.01); *G06F 17/30864* (2013.01)
(58) Field of Classification Search
CPC .................... G06F 17/30864; G06F 17/30867; G06F 17/30675; G06F 17/30696; G06Q 30/02
USPC ........................................................ 707/723
See application file for complete search history.

(56) References Cited

U.S. PATENT DOCUMENTS

| 6,665,668 | B1 * | 12/2003 | Sugaya et al. ................. 707/730 |
| 6,721,463 | B2 * | 4/2004 | Naoi et al. ...................... 382/305 |
| 2002/0007384 | A1 * | 1/2002 | Ushioda et al. ............... 707/536 |
| 2002/0044688 | A1 * | 4/2002 | Naoi et al. ..................... 382/190 |
| 2002/0111941 | A1 * | 8/2002 | Roux et al. ......................... 707/3 |
| 2004/0255218 | A1 * | 12/2004 | Tada ................ G06F 17/30011 714/747 |
| 2005/0086224 | A1 * | 4/2005 | Franciosa et al. .................. 707/6 |
| 2007/0159649 | A1 * | 7/2007 | Nakai et al. .................. 358/1.14 |
| 2010/0080411 | A1 | 4/2010 | Deliyannis |
| 2011/0016112 | A1 * | 1/2011 | Yu ................................. 707/723 |
| 2011/0184938 | A1 * | 7/2011 | Hill .............................. 707/722 |

FOREIGN PATENT DOCUMENTS

| JP | H03-19083 A | 1/1991 |
| JP | 2005258831 A | 9/2005 |

(Continued)

OTHER PUBLICATIONS

Tomohiro Hasegawa, et al., "A Study on Query by Example for XML Documents", Proceedings of the 57th National Convention of IPSJ (3), Database and Media, Network, Japan, Information Processing Society of Japan, Oct. 5, 1998, pp. 3-381-3-282.

(Continued)

*Primary Examiner* — Augustine K Obisesan
*Assistant Examiner* — Lin Lin Htay

(57) ABSTRACT

A similar document is retrieved by performing a search using diagram information within documents, without being influenced by the description language within documents or the wording of complex sentences. First, feature data (feature amounts) of images is extracted from diagrams that are dotted throughout a document, with respect to a designated document that is designated by a person doing the search. Thereafter, the similarity between documents is evaluated, by comparing the feature amounts of diagrams in the designated document with the feature amounts of diagrams in a document group serving as a search target that are extracted in advance. Ranking of similar documents to the designated document is realized, based on the evaluation result.

6 Claims, 15 Drawing Sheets

(56) References Cited

FOREIGN PATENT DOCUMENTS

| | | | |
|---|---|---|---|
| JP | 2006148263 A | 6/2006 | |
| JP | 4545641 B | 12/2006 | |
| JP | 2007-095102 A | 4/2007 | |
| JP | 2008252877 A | 10/2008 | |
| JP | WO 2009087815 A1 * | 7/2009 | ........ G06F 17/30675 |
| JP | 2010218216 A | 9/2010 | |
| JP | 2010250359 A | 11/2010 | |
| JP | 2011-170778 A | 9/2011 | |
| JP | 2011-233023 A | 11/2011 | |
| WO | 2009/081791 A1 | 7/2009 | |
| WO | 2009/087815 A1 | 7/2009 | |

OTHER PUBLICATIONS

Japanese Office Action for JP Application No. 2012-056378 mailed on Dec. 4, 2015 with English Translation.

* cited by examiner

FIG. 5

Overall Document Information Table

| Document URL | Updated on | Total line count |
|---|---|---|
| ¥¥Server1¥~¥book1.doc | 2011/04/13 | 152 |
| ¥¥Server1¥~¥book2.html | 2011/04/13 | 86 |
| : | : | : |
| ¥¥Server1¥~¥book6.pdf | 2011/07/13 | 53 |
| : | : | : |
| ¥¥Server2¥~¥book32.ppt | 2011/08/06 | 78 |
| : | : | : |

FIG. 6

Diagram Information Table

| Document URL | Appearance position of diagram (line) | Appearance order of diagram | Feature amount 1 of diagram | ... | Feature amount n of diagram |
|---|---|---|---|---|---|
| ￥￥Server1￥~~￥book1.doc | 1 | 1 | 543 | | 675 |
| ￥￥Server1￥~~￥book1.doc | 5 | 2 | 234 | | 345 |
| .. | | | | | |
| ￥￥Server1￥~~￥book1.doc | 142 | 32 | 78 | | 964 |
| .. | | | | | |
| ￥￥Server1￥~~￥book2.html | 32 | 1 | 132 | | 345 |
| .. | | | | | |

FIG. 12

Diagram information image of designated document A

Diagram information image of registered document B

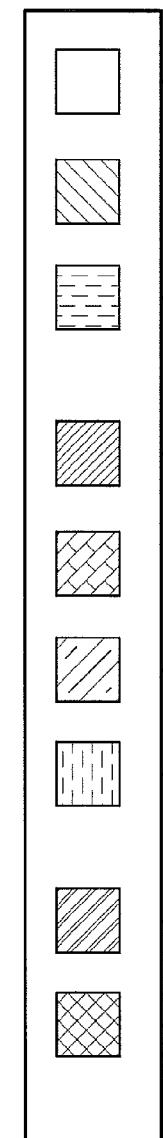
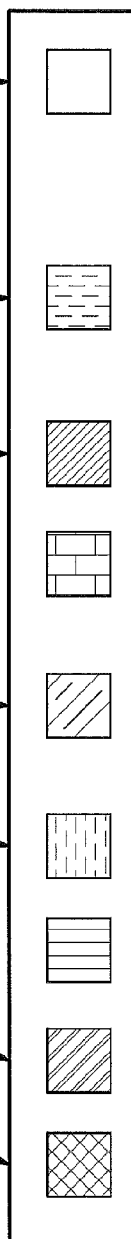

B61:
 Sole matching diagram information

B62:
 Sequences of diagrams & intervals (line counts) between diagrams match
 → flows of contents & information amounts match B63:
 Sequences of diagrams match but intervals (line counts) between diagrams do not match
 → flows of contents match but information amounts do not match (contents encompassed)

B64:
 Sequences of diagrams do not match but information amounts match

Conventional similar document retrieval method

Similar document retrieval method of present invention

RETRIEVAL APPARATUS, RETRIEVAL METHOD, AND COMPUTER-READABLE RECORDING MEDIUM

CROSS-REFERENCE TO RELATED APPLICATION

This application is based upon and claims the benefit of priority from Japanese patent application No. 2012-56378, filed on Mar. 13, 2012, the disclosure of which is incorporated herein in its entirety by reference.

BACKGROUND OF THE INVENTION

1. Field of the Invention

The present invention relates to a retrieval apparatus and a retrieval method that are for retrieving similar documents utilizing information relating to diagrams included in documents, and further relates to a computer-readable recording medium having recorded thereon a program for realizing the apparatus and method.

2. Description of Related Art

A similar document retrieval system has a function of finding documents that are similar to a document input by the person doing the search (input document) from among document information that is being held. According to the similar document retrieval system, by inputting a document that serves as a basis for retrieving similar documents as a search expression, the person doing the search is thus able to acquire, as a search result, a group of similar documents that match the search expression.

Also, the similar document retrieval system is mainly provided with functional elements such as a crawler for collecting information for a search, a searcher for actually performing the search based on the information collected by the crawler, and scoring for ordering the search.

In the similar document retrieval system, a search based on the information collected by the crawler is executed by the searcher with respect to the input document, and a search result is returned. At this time, a similarity based on some sort of index is computed by scoring, and ordering (ranking) is performed on the search result.

Incidentally, with the scoring in the similar document retrieval system, in many cases the person doing the search requires that the similarity be computed based on the similarity of descriptive contents rather than a simple comparison of sentences. This is the case even with similar document retrieval of documents written in different languages such as Japanese and English. A number of techniques that involve performing a search by computing the similarity based on the contents of documents have thus been proposed as techniques for retrieving similar documents, aside from retrieval techniques that simply involve comparing texts.

For example, JP 2010-218216A (hereinafter, "Literature 1") discloses a technique for performing a search by computing the similarity from the frequency with which keywords unique to a user that correspond to search terms appears, using a dictionary of related terms.

However, with the technique disclosed in Literature 1, aside from a database of documents, a large-scale database relating to related terms will be needed in order to execute a search. Further, since character information such as keywords is targeted for evaluation, erroneous evaluation may result from the wording of complex sentences or it may not be possible to compute the similarity of the contents of documents written using different languages.

Also, JP 2005-258831A (hereinafter, "Literature 2") discloses a technique for computing the similarity by focusing on a section of a main element (claims, etc.) of a standard text such as patent filing documents, further dividing the section focused on, and comparing each of the resultant sections with each document in a group of documents. With the technique disclosed in Literature 2, because translation is performed before the similarity is computed in the case where the language of the input document differs from the language of documents in the database, it is possible to search for similar documents of different languages.

However, even with the technique disclosed in Literature 2, similarity may be erroneously evaluated in the case of documents of different languages, given the difficulty in computing the similarity correctly due to factors such as differences in grammar and the nuance of words.

Thus, with regard to the conventional similar document retrieval techniques disclosed in Literature 1 and Literature 2, it has been pointed out that since the similarity is computed by focusing on character information, there is a problem in that the similarity evaluation is influenced by the description language.

Also, comparison information that can be focused on apart from character information includes information specifying diagrams cited within documents (hereinafter, "diagram information"). Given that the role of a diagram in a document is to summarize the contents mentioned preceding and/or following the diagram, diagram information is able to directly represent the contents described in the document. Additionally, since diagram information is constituted by image data, it also is possible to evaluate similarity without being affected by the description language.

For example, JP 2006-148263 (hereinafter, "Literature 3") discloses technology for interpolating a region of an image including ticker characters that is missing due to the ticker characters, and restoring an image that does not include ticker characters. Further, JP 4545641 (hereinafter, "Literature 4") discloses technology for dividing an image into small sections, and determining whether an image is similar by comparing the similarity of partial images.

By combining the technologies disclosed in Literature 3 and Literature 4, images from which character information included within diagrams, that is, within images, has been eliminated can be generated, and it can be investigated whether images are similar based on the generated images. Also, since this combined technology also enables similarity to be determined using partial images, it is also possible to determine similarity using other sections of an image from which character information has been eliminated, even when there are parts that could not be restored.

In view of the above points, diagram information is conceivably a very useful judgment material, in order to perform a similar document retrieval without being influenced by factors such as the description language or the wording of complex sentences.

Additionally, JP 2008-252877A (hereinafter, "Literature 5") discloses a technique for determining whether an original document imported as an image is similar to a registered image that is registered in advance, as a technique for evaluating the similarity of images. Specifically, with the technique disclosed in Literature 5, an original document image that includes characters and photographs is divided into character regions and image regions, and extraction of features and computation of feature amounts based on the features is performed by region. The similarity between the original document image and the registered image is then determined using the computed feature amounts. According to the technique disclosed in Literature 5, it is thus possible to locate parts in which there are diagrams (images) from within an original document, and to evaluate the similarity thereof.

However, with the above-mentioned techniques respectively disclosed in Literature 3, Literature 4 and Literature 5, since only one image or one sheet of an original document is targeted for evaluation, and evaluation of similarity for an entire document is not taken into consideration, it is difficult to perform similar document retrieval that takes the contents of an entire document into consideration.

Also, JP 2010-250359A (hereinafter, "Literature 6") discloses a technique for searching for a document that includes a target image, using a document that includes images as an input. Specifically, with the technique disclosed in Literature 6, first, feature amounts of image data such as diagrams included in a document and terms extracted from the captions of images are pasted into the document as a search index, and a pseudo document is thereby created. Thereafter, the target image or a document including the target image is searched for based on the pseudo document. Also, with the technique disclosed in Literature 6, since the person doing the search is able to selectively change the weight for determining the similarity with respect to images and terms, it is also conceivably possible to target only a plurality of pieces of diagram information that are dotted throughout a document, and search for a target document that includes those pieces of diagram information.

However, with the technique disclosed in Literature 6, in the case where similarity is evaluated using only diagram information, rather than evaluating similarity with consideration for the contents of a document, there is concern that it will simply be determined how many images are the same. Thus, even with the technique disclosed in Literature 6, it is possible that similarity will not be appropriately evaluated using only diagram information, since similar document retrieval that looks in-depth at the contents of the document desired by the person doing the search, such as the flow of the contents of the document, is not performed.

Heretofore, in the field of similar document retrieval, various retrieval techniques have thus been proposed as techniques for finding documents with similar contents to a document input by the person doing the search. With conventional retrieval techniques that have been proposed, the character information within documents is focused on, and a search is performed by evaluating the similarity of the contents of documents based on the character information.

In other words, with conventional retrieval techniques, it has been pointed out that since similarity is evaluated based on character information, there is a problem in that the similarity may not be correctly computed depending on the wording of complex sentences, resulting in it being difficult to evaluate the similarity of documents written in different languages given the differences in grammar and the nuance of words.

SUMMARY OF THE INVENTION

An exemplary object of the present invention is to solve the above problems and provide a retrieval apparatus, a retrieval method and a computer-readable recording medium that are able to realize similar document retrieval that takes the contents of an entire document into consideration, using diagram information.

In order to attain the above-mentioned object, a retrieval apparatus according to one aspect of the present invention includes a data receiving unit that receives data to serve as a search condition, a diagram information extraction unit that extracts diagram information included in the data, a similarity estimation unit that compares the extracted diagram information with diagram information of a registered document that is registered in advance, and estimates a similarity between the data and the registered document, and a scoring unit that generates a search result capable of specifying a similar document that is related to the data, based on the estimated degree of similarity.

In order to attain the above-mentioned object, a retrieval method according to one aspect of the present invention includes the steps of (a) receiving data to serve as a search condition, (b) extracting diagram information included in the data, (c) comparing the diagram information extracted in the step (b) with diagram information of a registered document that is registered in advance, and estimating a similarity between the data and the registered document, and (d) generating a search result capable of specifying a similar document that is related to the data, based on the similarity estimated in the step (c), the steps being executed by one or a plurality of computers.

Further, in order to attain the above-mentioned object, a computer-readable recording medium according to one aspect of the present invention has recorded thereon a program that includes a command for causing a computer to execute the steps of (a) receiving data to serve as a search condition, (b) extracting diagram information included in the data, (c) comparing the diagram information extracted in the step (b) with diagram information of a registered document that is registered in advance, and estimating a similarity between the data and the registered document, and (d) generating a search result capable of specifying a similar document that is related to the data, based on the similarity estimated in the step (c).

As mentioned above, according to the present invention, similar document retrieval that takes the contents of an entire document into consideration can be realized using diagram information.

BRIEF DESCRIPTION OF THE DRAWINGS

FIG. 5 is a diagram showing an example of an overall document information table stored in a diagram information database shown in FIG. 1 and FIG. 2.

FIG. 6 is a diagram showing an example of a diagram information table stored in the diagram information database shown in FIG. 1 and FIG. 2.

FIG. 12 is a diagram conceptually illustrating the flow of similarity estimation processing shown in FIG. 3.

EXEMPLARY EMBODIMENT

Outline of the Invention

A retrieval apparatus and a retrieval method according to a prescribed embodiment of the present invention enable similar documents to be retrieved in similar document retrieval using diagram information within documents, without being influenced by the description language within documents or the wording of complex sentences.

Specifically, the present invention enables similar documents to be retrieved, without being influenced by character information, by focusing on diagram information extracted from image data within documents. Also, with the present invention, diagram information within a document is taken as information that summarizes the contents preceding and/or following a diagram, and the similarity between documents can be evaluated using the diagram information as a search index. Specifically, with regard to a document designated by a person doing a search, feature data (feature amounts) is extracted from the image data of diagrams that are dotted throughout the document. Thereafter, the similarity between documents is evaluated, by comparing the feature amounts of the diagrams of the designated document with feature amounts of diagrams in a document group that were extracted in advance and serve as the search target. Similar documents to the designated document are ranked, based on the evaluation values.

In order to also take the flow of the contents of documents into consideration, the similarity preferably is evaluated using the "sequence of diagrams" and the "appearance position of diagrams", in addition to the feature data of diagrams. That is, first, information on the "sequence of diagrams" and the "appearance position of diagrams" is also extracted from document data, in addition to the feature data of diagrams. The sequence of diagrams and the interval between diagrams are respectively taken as the flow of a document and the information amount of sentences between diagrams, and the similarity of an entire document is evaluated by utilizing this information to interpolate the similarity between the designated document and the documents serving as a search target. As a result, because a comparison that takes document contents into consideration is also performed in addition to a simple comparison of diagram information, search accuracy will improve. A conventional retrieval method is also applied to compute a score value of the similarity, and by also employing this value, a search using a multi-faceted index is also possible.

Figure 14A:
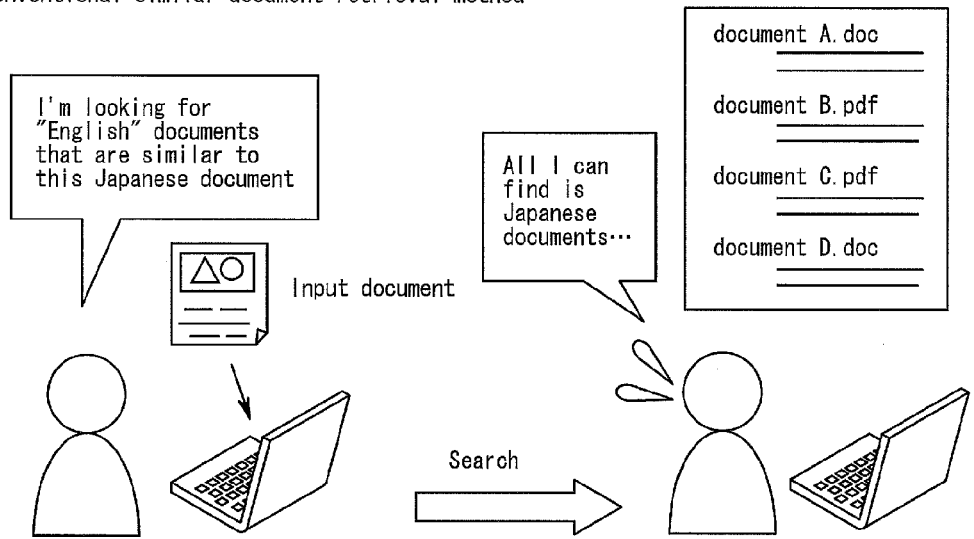
FIG. 14A is a diagram schematically showing a conventional retrieval method.
Figure 14B:
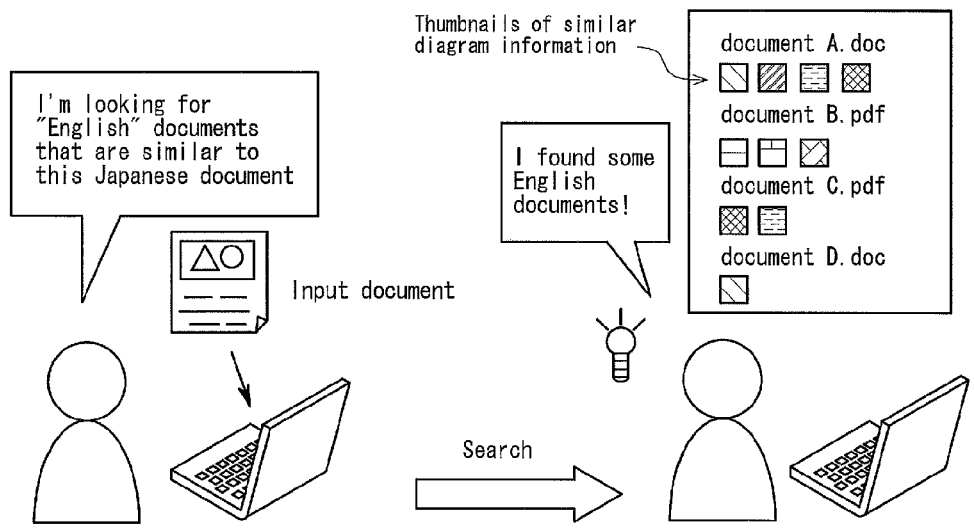
FIG. 14B is a diagram schematically showing a retrieval method in an embodiment of the present invention.

According to the present invention, the outstanding effect of being able to find similar documents to a designated document, without being influenced by the description language within the documents or the wording of complex sentences, can be achieved. The outstanding effect of being able to find similar documents written in a different language is also achieved (see FIGS. 14A and B). FIG. 14A is a diagram schematically showing a conventional retrieval method, and FIG. 14B is a diagram schematically showing a retrieval method in the embodiment of the present invention.

Embodiments

Hereafter, embodiments of the present invention will be described in detail, with reference to the drawings. Note that the same reference signs are given to elements that are the same, and redundant description is omitted.

Apparatus Configuration

Figure 1:
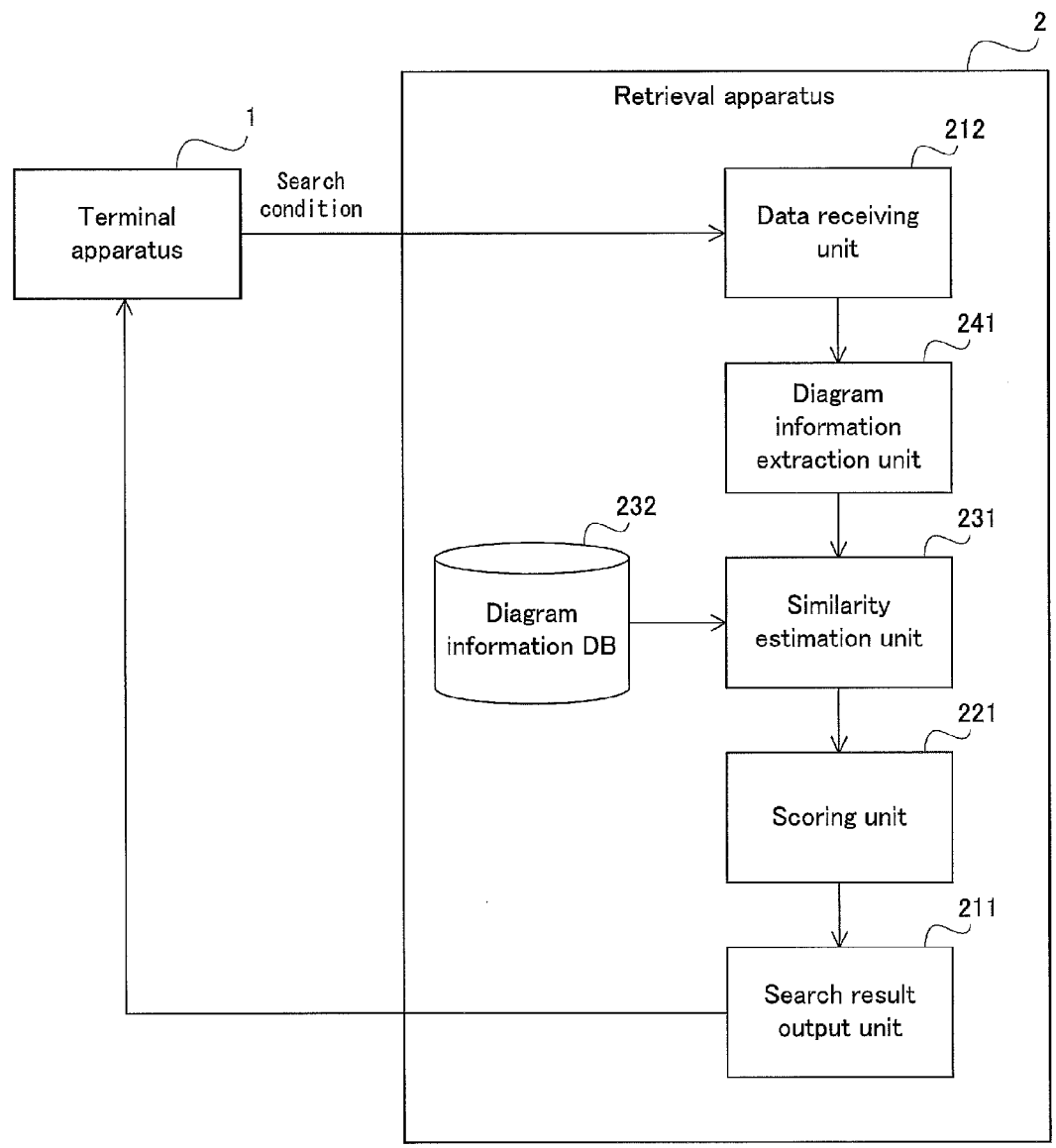
FIG. 1 is a block diagram schematically showing a configuration of a retrieval apparatus in an embodiment of the present invention.

Initially, a schematic configuration of a retrieval apparatus in an embodiment of the present invention will be described using FIG. 1. FIG. 1 is a block diagram schematically showing the configuration of the retrieval apparatus in an embodiment of the present invention. As shown in FIG. 1, a retrieval apparatus 2 in the present embodiment is mainly provided with a data receiving unit 212, a diagram information extraction unit 241, a similarity estimation unit 231, and a scoring unit 221.

The data receiving unit 212 receives data that serves as a search condition (hereinafter, "search condition data"). In the present embodiment, a search condition is a document designated by the person doing the search, and search condition data is document data. Once the person doing the search has designated a document on a terminal apparatus 1 connected to the retrieval apparatus 2, document data of the designated document is transmitted to the retrieval apparatus 2. Note that, henceforth, the terminal apparatus 1 will be denoted as "search terminal 1".

The diagram information extraction unit 241 extracts diagram information that is included in the search condition data. Also, the diagram information extraction unit 241 transmits the extracted diagram information to the similarity estimation unit 231.

The similarity estimation unit 231 compares the extracted diagram information with diagram information of a registered document that has been registered in advance, and estimates the similarity between the search condition data and the registered document. In the present embodiment, a registered document group that serves as a search target is registered in a document database (see FIG. 2), and diagram information of the registered document group is further stored in a diagram information database 232.

Once the similarity has been estimated by the similarity estimation unit 231, the scoring unit 221 generates a search result capable of specifying a similar document that is related to the search condition data, based on the estimated degree of similarity.

In the present embodiment, the retrieval apparatus 2 is further provided with a search result output unit 211. The search result generated by the scoring unit 221 is transmitted to the search terminal 1 by the search result output unit 211.

In the retrieval apparatus 2, the similarity between diagrams included in a document serving as the search condition and diagrams included in registered documents is thus determined, and similar documents are specified from the determination result. Accordingly, the retrieval apparatus 2 enables similar document retrieval that takes the contents of entire documents into consideration to be realized using diagram information.

Figure 2:
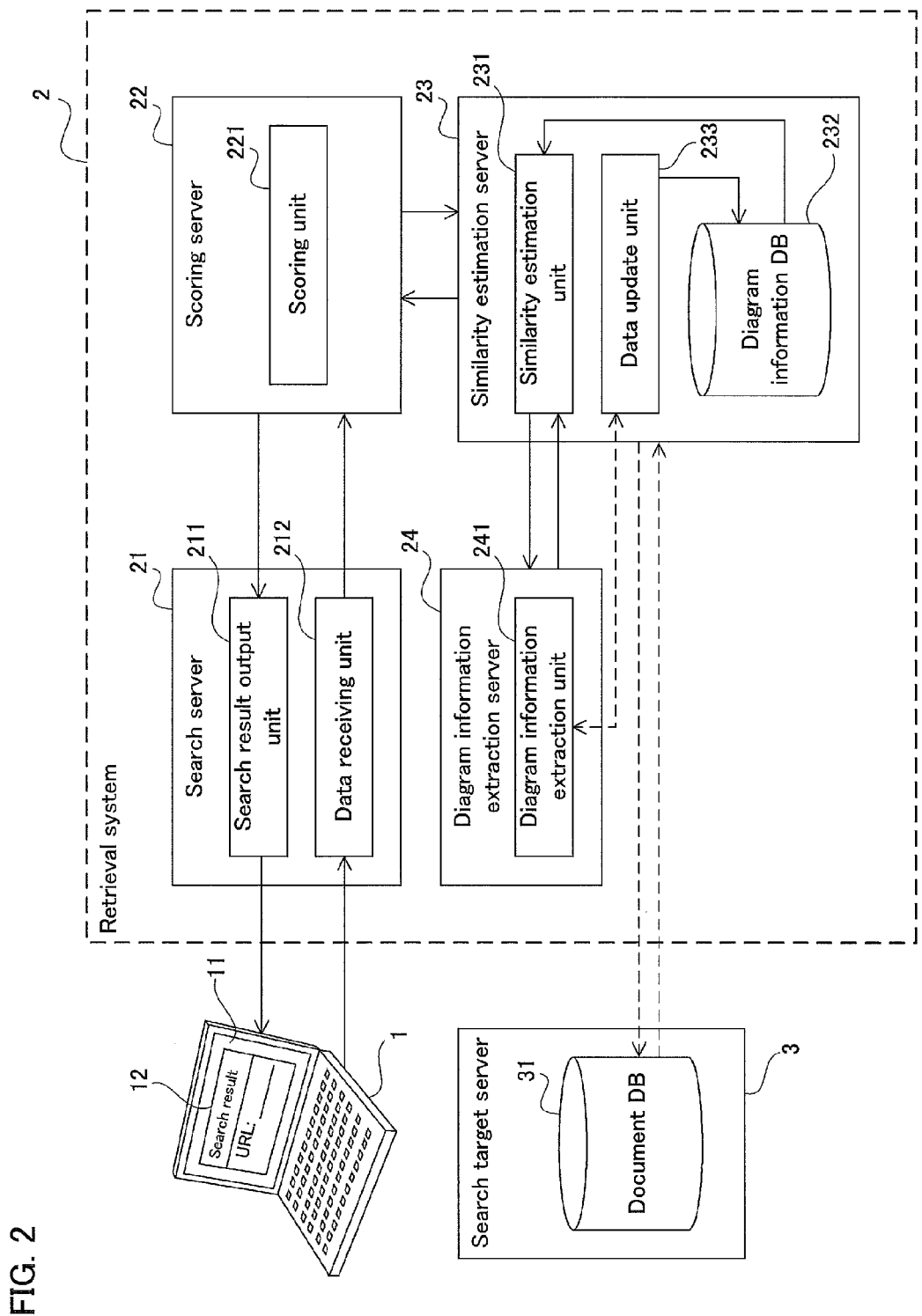
FIG. 2 is a block diagram showing an example of a computer system that structures a retrieval apparatus in an embodiment of the present invention.

Here, the configuration of the retrieval apparatus 2 in the present embodiment will be described more specifically using FIG. 2. FIG. 2 is a block diagram showing an example of a computer system that structures the retrieval apparatus in the embodiment of the present invention. In the example of FIG. 2, the retrieval apparatus 2 is realized by a computer system, and the components (see FIG. 1) constituting the retrieval apparatus 2 are respectively built by separate server computers. As shown in FIG. 2, the retrieval apparatus 2 is provided with a search server 21, a scoring server 22, a similarity estimation server 23, and a diagram information extraction server 24. In the following description, the retrieval apparatus 2 will also be denoted as the retrieval system 2.

Also, as shown in FIG. 2, the retrieval system 2 is connected to the search terminal 1 that is used by the person doing the search and a search target server 3 that is provided with a document database 31, via a network (not shown) such as the Internet or an in-house LAN. The retrieval system 2 structures one similar document retrieval system, together with the search terminal 1 and the search target server 3.

The search terminal 1 is provided with a display unit 11 that displays a search screen and search results on the screen. Specifically, the display unit 11 is a display apparatus such as a liquid crystal display. For example, when the person doing the search designates a document to serve as the search condition, the search terminal 1 displays the designated document on the screen of the display unit 11. Also, the search terminal 1 transmits the document data of the designated document to the search server 21 as search condition data.

Also, the search terminal 1, on a search result corresponding to the search condition data transmitted to the search server 21 being transmitted thereto by the search server 21, displays this search result on the screen of the display unit 11. In the present embodiment, a search result 12 is displayed in the example in FIG. 2. The search result 12 includes a URL for accessing a registered document (similar document) specified by the search. The person doing the search can acquire a registered document that is similar by accessing the URL included in the search result 12.

As shown in FIG. 2, the search server 21 is provided with the data receiving unit 212 (see FIG. 1) and the search result output unit 211. The data receiving unit 212 receives the search condition data (document data) transmitted from the search terminal 1, as described using FIG. 1. Also, the data receiving unit 212 further transmits the received search condition data to the scoring server 22. Note that, in the example in FIG. 2, the search condition data is transmitted to the diagram information extraction server 24 via the scoring server 22 and the similarity estimation server 23, after being transmitted to the scoring server 22.

Also, the search result output unit 211 receives a search result from the scoring server 22, and thereafter transmits the received search result to the search terminal 1. The search result includes a scoring performed by the scoring server 22 and a ranking based on a result of the scoring, as will be discussed later.

As shown in FIG. 2, the diagram information extraction server 24 is provided with the diagram information extraction unit 241 (see FIG. 1). The diagram information extraction unit 241, on receiving the search condition data via the scoring server 22 and the similarity estimation server 23, extracts diagram information that is included in the search condition data, as described using FIG. 1. Specifically, the diagram information extraction unit 241 extracts, from the search condition data, information such as the feature amounts of diagrams (image data) included in the document serving as the search condition, the appearance order of each diagram, and the appearance position of each diagram, as diagram information. Also, the diagram information extraction unit 241 transmits the extracted diagram information to the similarity estimation server 23. Note that further details of the operations of the diagram information extraction unit 241 will be discussed later using FIG. 4.

As shown in FIG. 2, the similarity estimation server 23 is provided with the similarity estimation unit 231 (see FIG. 1), the diagram information database 232 (see FIG. 1), and a data update unit 233. The similarity estimation unit 231, on receiving search condition data from the scoring server 22, starts up using this data as an argument, and transmits the received search condition data to the diagram information extraction unit 241.

The similarity estimation unit 231, on receiving the diagram information of the search condition data from the diagram information extraction unit 241, collates the received diagram information with the diagram information of the registered document group registered in the diagram information database 232, and estimates the similarity between the search condition data and the registered document group. Also, the similarity estimation unit 231 transmits the estimation result (degree of similarity) for every registered document to the scoring server. Note that the further details of the operations of the similarity estimation unit 231 will be discussed later using FIG. 5 to FIG. 12.

Also, the data update unit 233 periodically accesses the document database 31 of the search target server 3, and acquires the document data of the latest documents from the document group stored therein. The data update unit 233 sends the acquired document data to the diagram information extraction unit 241 of the diagram information extraction server 24, and causes the diagram information extraction unit 241 to extract the diagram information of the acquired document data. Thereafter, the data update unit 233, on receiving the extracted diagram information, updates the data of the diagram information database 232 using this diagram information. Note that further details of the operations of the data update unit 233 will be discussed later using FIG. 13.

As shown in FIG. 2, the scoring server 22 is provided with the scoring unit 221. The scoring unit 221, on search condition data being transmitted thereto from the search server 21, transmits the received search condition data to the similarity estimation server 23, and further requests the similarity estimation server 23 to estimate the similarity between the search condition data and the registered document group.

Also, the scoring unit 221, on an estimation result being transmitted thereto from the similarity estimation server 23, specifies similar documents that are related to the search condition data and generates a search result that includes the specified similar documents, based on this estimation result, as described using FIG. 1. Specifically, the scoring unit 221 ranks the specified similar documents, based on the estimation result, and takes the ranking result as the search result. Further, the scoring unit 221 transmits the generated search result to the search server 21.

Also, the estimation result serving as the basis of the ranking by the scoring unit 221 is obtained from only diagram information. Accordingly, in the present embodiment, the ranking result can be said to be created based only on diagram information. Note that the further details of the operations of the scoring unit 221 will be discussed later.

Also, in the present embodiment, the data receiving unit 212 and the search result output unit 211 are built by a program installed on the search server 21. Similarly, the scoring unit 221 is built by a program installed on the scoring server 22, and the similarity estimation unit 231 and the data update unit 233 are built by a program installed on the similarity estimation server 23. Also, the diagram information extraction unit 241 is built by a program installed on the diagram information extraction server 24.

Apparatus Operation

Next, the operations of the retrieval system 2 in the embodiment of the present invention will be described using FIG. 3 to FIG. 13. Also, in the following description, FIG. 1 and FIG. 2 are referred to as appropriate. Also, in the present embodiment, a retrieval method is implemented by operating the retrieval apparatus 2. Therefore, description of the retrieval method in the present embodiment is replaced with the following description of the operations of the retrieval apparatus (retrieval system).

Also, in the present embodiment, processing in the retrieval system 2 is mainly divided into a similar document retrieval phase and a diagram information database update phase. Accordingly, hereinafter, first, the similar document retrieval phase will be described, and then the update phase will be described.

Here, the similar document retrieval phase denotes processing in which a search for similar documents is performed by the similarity estimation unit 231, the diagram information extraction unit 241, the scoring unit 221, and the database 232 of diagram information within documents, based on the document data (search condition data) of the document designated by the person doing the search, and a search result is displayed. Also, the update phase denotes processing in which the data update unit 233 updates the data in the diagram information database 232, using the document group stored in the document database 31 of the search target server 3.

Apparatus Operation>Search Phase

Figure 3:
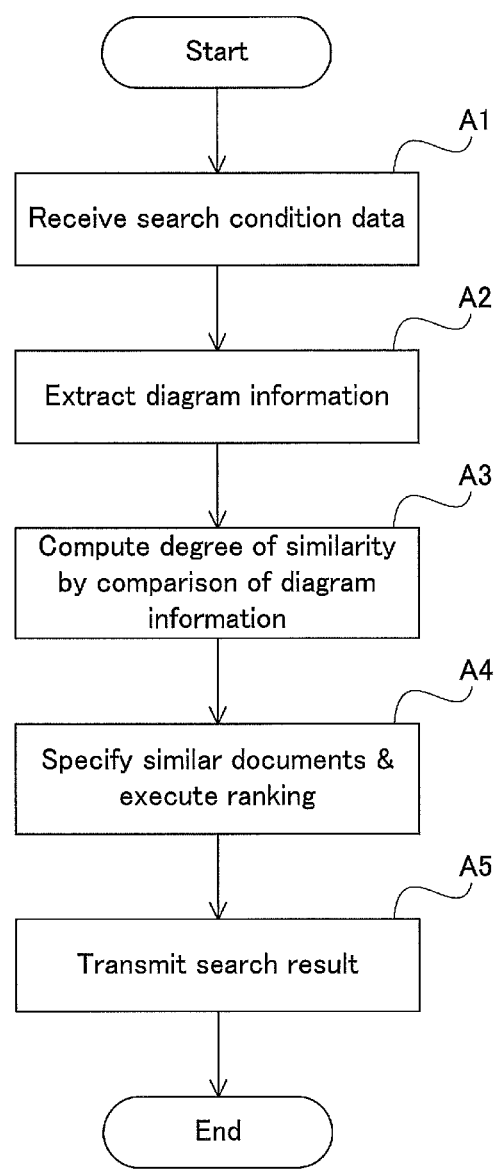
FIG. 3 is a flowchart showing operations in a search phase of a retrieval apparatus in an embodiment of the present invention.

Initially, the entire search phase will be described using FIG. 3. FIG. 3 is a flowchart showing operations in the search phase of the retrieval apparatus in the embodiment of the present invention.

First, once the person doing the search has, as a precondition, designated a document to serve as the search condition on the search terminal 1, the search terminal 1 transmits document data (search condition data) of the designated document to the search server 211. As shown in FIG. 3, in the search server 211, the data receiving unit 212 thereby receives the transmitted search condition data (Step A1). Further, in step A1, the data receiving unit 212 transmits the received search condition data to the scoring server 22.

Once step A1 has been executed, the search condition data is sent to the diagram information extraction server 24, via the scoring server 22 and the similarity estimation server 23. Specifically, after execution of step A1, the scoring unit 221 of the scoring server 22 transmits the received search condition data and a similarity estimation request to the similarity estimation server 23. Further, the similarity estimation server 23, on receiving the search condition data and the estimation request, transmits the received search condition data to the diagram information extraction server 24.

Next, the diagram information extraction server 24, on receiving the search condition data, starts up the diagram information extraction unit 241. The diagram information extraction unit 241 thereby extracts, from search condition data, information such as the feature amounts of diagrams (image data) included in the document serving as the search condition, the appearance order of each diagram, and the appearance position of each diagram, as diagram information (step A2). Also, in step A2, the diagram information extraction unit 241 transmits the extracted diagram information to the similarity estimation server 23.

Next, in the similarity estimation server 23, the similarity estimation unit 231 collates the received diagram information with the diagram information of each registered document that is registered in the diagram information database 232, and estimates the similarity between the search condition data and the registered document group (step A3). Also, in step A3, the similarity estimation unit 231 transmits an estimated degree of similarity for every registered document to the scoring server 22.

Next, in the scoring server 22, the scoring unit 221 generates a search result capable of specifying similar documents that are related to the search condition data, based on the similarities estimated at step A3, and transmits the generated search result to the search server 21 (step A4). Specifically, the scoring unit 221 ranks the registered documents by assigning similarity scores, and transmits the ranking result to the search server 21 as the search result.

Next, in the search server 21, the search result output unit 211 generates screen data of the search result 12 to be displayed on the screen of the search terminal 1, based on the search result received from the scoring server 22, and transmits the generated screen data to the search terminal 1 (step A5). In the search terminal 1, the search result 12 (see FIG. 2) is thereby displayed on the screen of the display unit 11.

Apparatus Operation>Search Phase>Step A2

Figure 4:
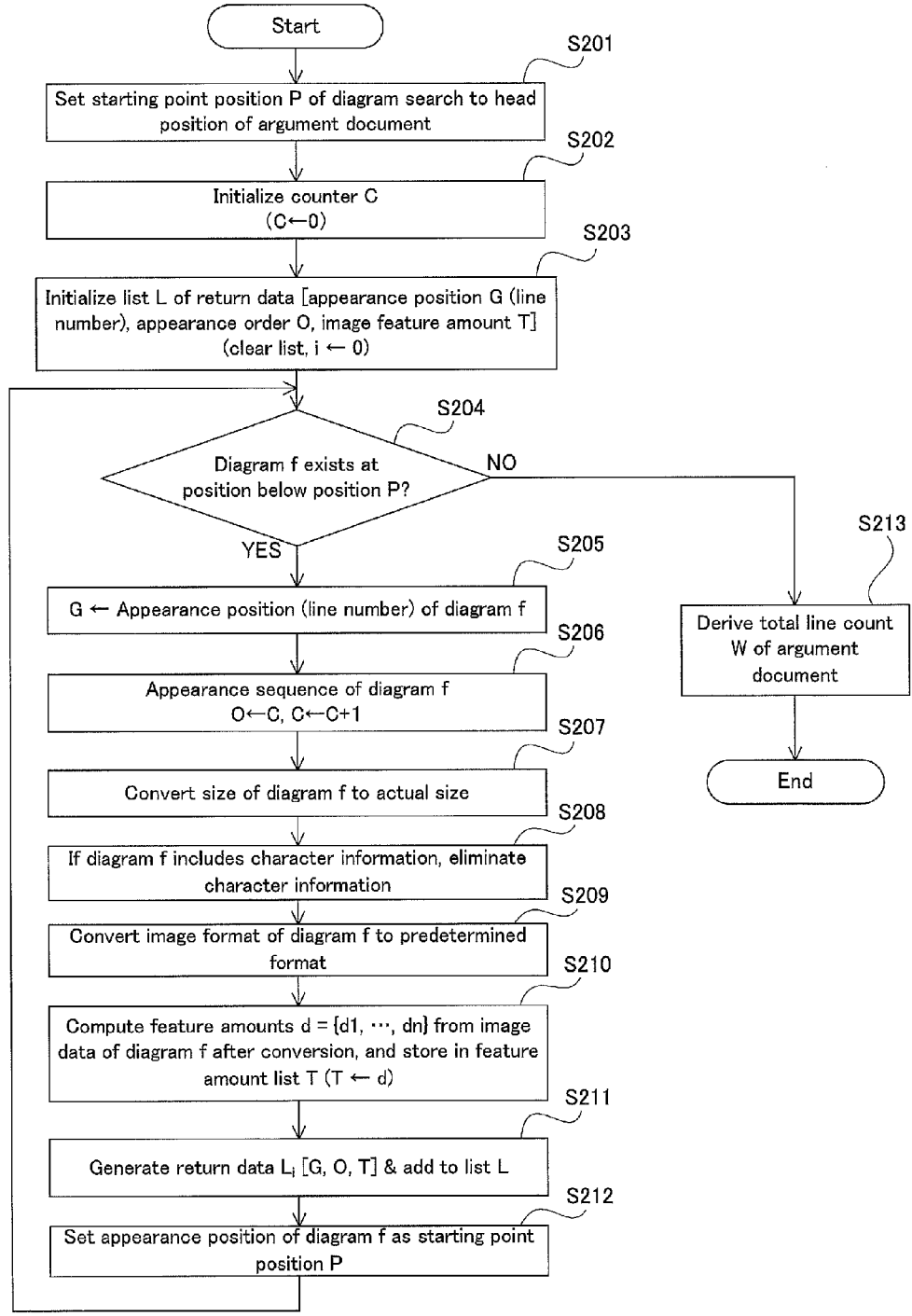
FIG. 4 is a flowchart showing details of diagram information extraction processing shown in FIG. 3.

Next, diagram information extraction processing (step A2) shown in FIG. 3 will be described in detail using FIG. 4. FIG. 4 is a flowchart showing details of the diagram information extraction processing shown in FIG. 3. The processing shown in FIG. 4 is mainly executed by the diagram information extraction unit 241.

As shown in FIG. 4, first, the diagram information extraction unit 241 sets a starting point position P to serve as the starting point of the search for diagram information to the first line of an argument document (document serving as the search condition) (step S201), and further initializes a counter C for specifying the appearance order of the diagrams to set C=0 (S202).

Next, the diagram information extraction unit 241 initializes a return data list L to clear the list, and sets i=0 (S203). In the example in FIG. 4, the return data list L is diagram information that is transmitted to the similarity estimation server 23, and $L_i$ shows the i-th return data in the return data list L. Also, each return data $L_i$ includes an appearance position (line number) G of a diagram, an appearance order O, and an image feature amount list T. The return data list L represents a plurality of return data in list format.

Once the initialization processing of steps S201 to S203 has ended, the diagram information extraction unit 241 searches line-by-line for a diagram that is located below the starting point position P, and judges whether a diagram f exists (step S204). In other words, the diagram information extraction unit 241 searches line-by-line for diagrams from the first line of the document. Note that f indicates the number of a diagram that is specified by the search.

If a result of the determination of step S204 indicates that a diagram f is located below the starting point position P (S204: YES), the diagram information extraction unit 241, after setting the variable G indicating the appearance position of the diagram f to the line number of the diagram f (step S205), and further setting the variable O indicating the appearance order of the diagram f to the value of the counter C, increments the value of the counter C (step S206).

Next, the diagram information extraction unit 241 converts the size of the diagram f to actual size, in the case where the diagram f is pasted in the document in a reduced state (step S207). Next, in the case where the diagram f includes character information, the diagram information extraction unit 241 deletes parts corresponding to the character information from the image data of the diagram f, and interpolates the deleted parts (step S208). Note that steps S207 and S208 are performed so that accurate feature amounts are computed in the computation of feature amounts discussed later.

Next, the diagram information extraction unit 241 converts the format of the interpolated image data of the diagram f into a predetermined format (step S209). Also, at step S209, the diagram information extraction unit 241 executes format conversion so as to reduce any deterioration in image quality as much as possible.

Next, the diagram information extraction unit 241 extracts n features from the format-converted image data of the diagram f, and computes an image feature amount d ($=d_1$, $d_2$, ... $d_n$) for each extracted feature. The diagram information extraction unit 241 then stores the image feature amounts d computed for the diagram f in an image feature amount list T of the diagram f (step S210). Note that the technology disclosed in Literature 5 (JP 2008-252877A) or the like, for example, is used in computing the feature amounts in step S210.

Next, the diagram information extraction unit 241 adds the appearance position G of the diagram f set at step S205, the appearance order O of the diagram f set at step S206, and the image feature amount list T created at step S210 to the return data list L to a single piece of return data $L_i$ (step S211).

Next, once the processing up to step S211 has ended, the diagram information extraction unit 241 sets the appearance position of the diagram f as the starting point position P (step S212), and thereafter executes step S204 again. Steps S204 to S212 are repeatedly executed until the return data of all the diagrams included in the argument document is added to the return data list L.

On the other hand, if a result of the determination of step S204 indicates that a diagram f is not located below the starting point position P (S204: NO), the diagram information extraction unit 241 derives a total line count W of the document serving as the search condition (step S213), and ends the processing. Also, after execution of step S213, the diagram information extraction server 24 transmits the list L of return data to the similarity estimation server 23 as diagram information. Thereafter, step A3 is executed.

Apparatus Operation>Search Phase>Step A3

Next, the similarity estimation processing (step A3) shown in FIG. 3 will be described in detail using FIG. 5 to FIG. 12.

First, the diagram information database 232 utilized in the similarity estimation processing will be described using FIG. 5 and FIG. 6. FIG. 5 is a diagram showing an example of an overall document information table stored in the diagram information database shown in FIG. 1 and FIG. 2. FIG. 6 is a diagram showing an example of a diagram information table stored in the diagram information database shown in FIG. 1 and FIG. 2.

As shown in FIG. 5 and FIG. 6, the overall document information table and the diagram information table are stored in the diagram information database 232. Of these tables, the overall document information table holds the overall information of registered documents that are registered in the document database 31 (see FIG. 2). Specifically, as shown in FIG. 5, the overall information of each registered document includes a URL (document URL) showing a storage location, an update date and time, and a total line count of the registered document.

Also, the diagram information table holds diagram information of registered documents. Specifically, as shown in FIG. 6, each piece of diagram information includes a document URL of a registered document that includes a diagram, the appearance position (line) of the diagram, the appearance order of the diagram, and the feature amount of the diagram.

The diagram information database 232 uses these tables to manage diagram information required in the similarity estimation processing and information that is related to diagrams.

Figure 7:
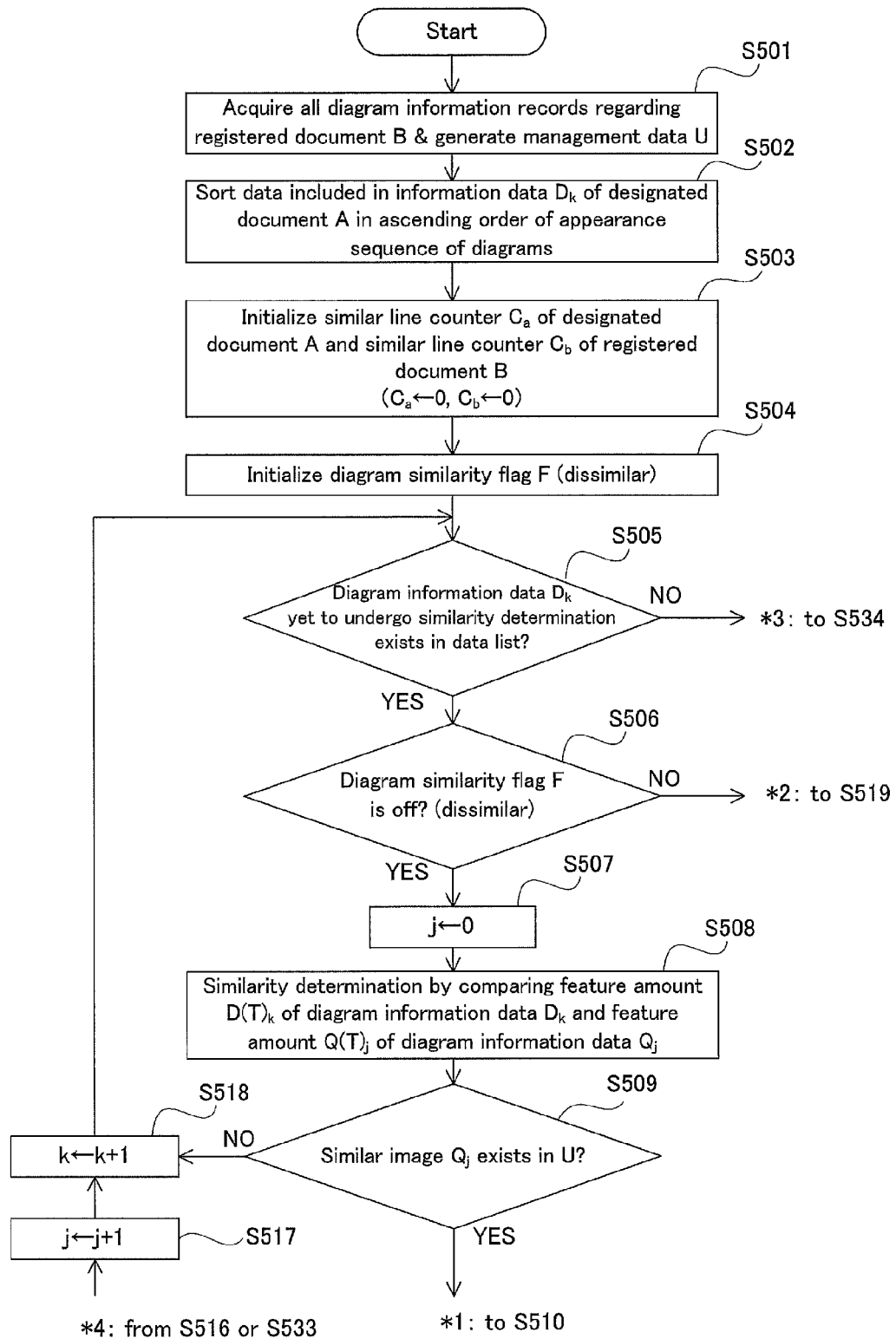
FIG. 7 is a flowchart showing details of similarity estimation processing shown in FIG. 3.
Figure 8:
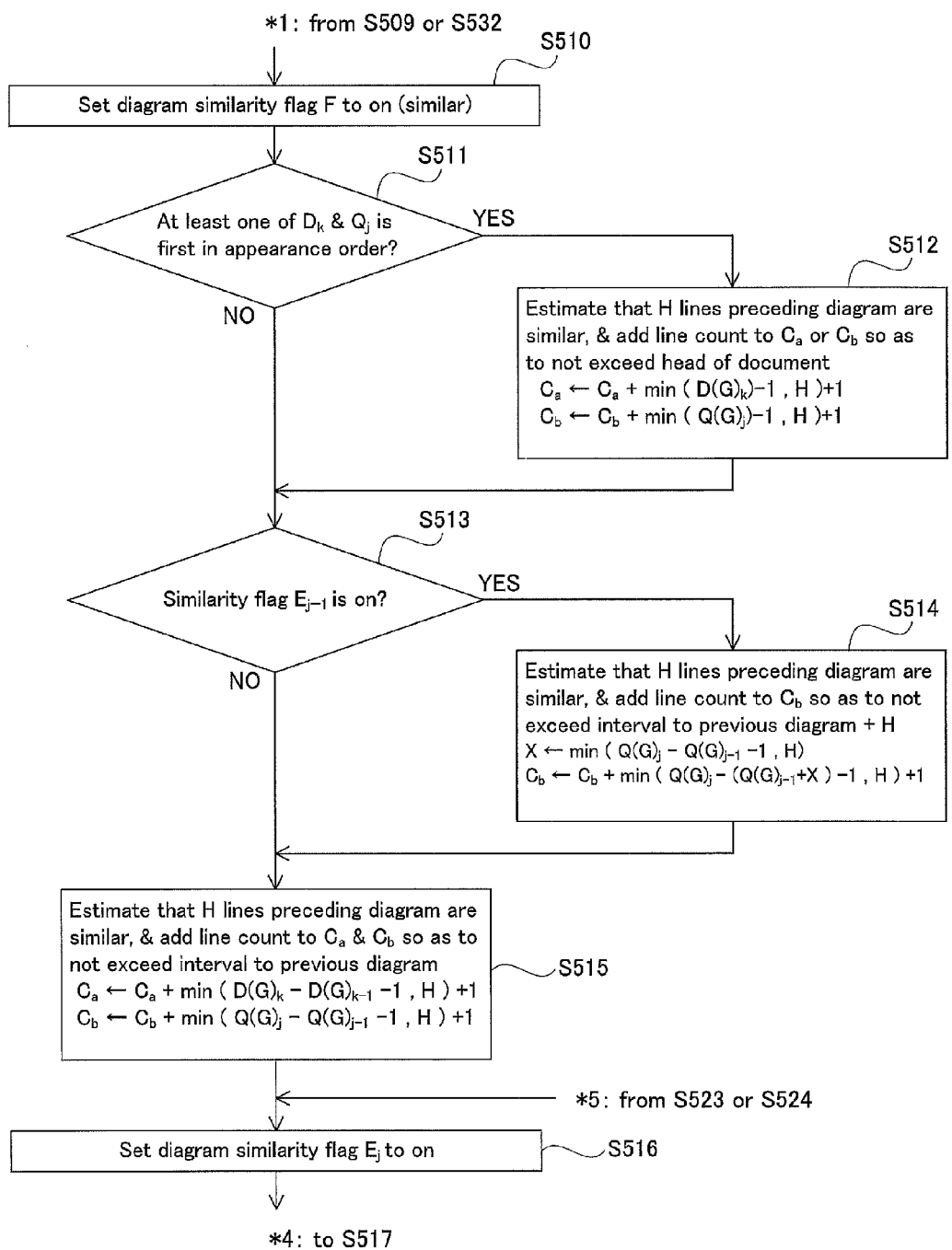
FIG. 8 is a flowchart showing details of similarity estimation processing shown in FIG. 3.

Next, the similarity estimation processing will be specifically described using FIG. 7 to FIG. 12. FIG. 7 to FIG. 11 are flowcharts respectively showing details of the similarity estimation processing shown in FIG. 3, and show a series of processing. Also, *1 to *6 in FIG. 7 to FIG. 12 are signs indicating the correspondence relationship between steps shown in different diagrams. For example, *1 indicates that step S510 in FIG. 8 is executed in the case where at step S509 in FIG. 7 is YES. FIG. 12 is a diagram conceptually illustrating the flow of the similarity estimation processing shown in FIG. 3.

As shown in FIG. 7, initially, the similarity estimation unit 231 accesses the diagram information database 232, and acquires all the records of diagram information (see FIG. 6) with regard to a specific registered document B, using the document URL of the registered document B (step S501). Note that, in FIG. 7 to FIG. 11, "designated document A" indicates a document designated as the search condition, and "registered document B" indicates a registered document whose diagram information is registered in the diagram information database 232.

Also, at step S501, the similarity estimation unit 231 sorts the acquired records in ascending order in line with the order of the diagrams, and creates a managed data list U of the registered document B using these records. Further, the similarity estimation unit 231 sets a variable j discussed later to 0 (j=0).

Specifically, the managed data list U includes diagram information data Q ($Q_0$, $Q_1$, ... ) corresponding respectively to the acquired records of diagram information and diagram similarity flags E ($E_0$, $E_1$, ... ). Note that the diagram information data $Q_j$ indicates the j-th piece of diagram information data in the managed data list U. Also, the diagram similarity flag $E_j$ is a flag indicating whether the diagram that is specified by j-th diagram information data $Q_j$ in the managed data list U is similar to a diagram of the designated document A.

Next, the similarity estimation unit 231, using the return data list L of the designated document A extracted at step A2 as the diagram information data list D, sorts diagram information data $D_k$ (return data $L_i$) of the diagrams included in the list in ascending order of the appearance order of the diagrams (step S502). Note that the diagram information data $D_k$ indicates the k-th diagram information data of the diagram information data list D.

Next, the similarity estimation unit 231 initializes a similar line counter $C_a$ and a similar line counter $C_b$, and sets $C_a=0$ and $C_b=0$ (step S503). The similar line counter $C_a$ indicates the line count of lines in the designated document A that are similar to the registered document B, and the similar line counter $C_b$ indicates the line count of lines in the registered document B that are similar to the designated document A.

Next, the similarity estimation unit 231 initializes the diagram similarity flag F (step S504). The diagram similarity flag F is a flag indicating whether diagram information data $D_{k-1}$ that underwent similarity judgment prior to the diagram information data $D_k$ of the designated document A was similar to the diagram information of the registered document B. As a result of step S504, the diagram similarity flag F will show that the diagram information data $D_{k-1}$ was dissimilar. As described above, various data is initialized by steps S501 to S504.

Next, in order to confirm the similarity of all of the diagram information of the designated document A, the similarity estimation unit 231 determines whether any diagram information data $D_k$ that has yet to undergo similarity determination exists in the diagram information data list D of the designated document A (step S505).

If a result of the determination of step S505 indicates that such data $D_k$ does not exist (S505: NO), step S534 (see FIG. 11) discussed later is executed. On the other hand, if a result of the determination of step S505 indicates that such data $D_k$ exists (S505: YES), the similarity estimation unit 231 determines whether the diagram similarity flag F is off (=0), that is, whether the immediately previous diagram information is similar (step S506).

If a result of the determination of step S506 indicates that the diagram similarity flag F is not off (S506: NO), step S519 discussed later is executed. On the other hand, if a result of the determination of step S506 indicates that the diagram similarity flag F is off (S506: YES), the similarity estimation unit 231 investigates whether a diagram that is similar to a diagram of the designated document A exists in the diagrams of the registered document B (S507 to S509).

Specifically, the similarity estimation unit 231 first sets the value of the variable j to 0 (zero) (step S507). Next, in order to determine the similarity of the diagrams of the designated document A and the diagrams of the registered document B, the similarity estimation unit 231 compares the feature amount list T (hereinafter, "D(T)$_k$") included in the diagram information data $D_k$ and the feature amount (hereinafter, "Q(T)$_j$") included in the diagram information data $Q_j$ (step S508). Also, the similar image determination technique disclosed in Literature 4 (JP 4545641), for example, can be used in the similarity determination of S508.

Next, the similarity estimation unit 231 determines whether an image (diagram information data $Q_i$) that is similar to a diagram in the designated document A exists in the managed data list U of the registered documents B (step S509), based on the comparison result of step S508.

If a result of the determination of step S509 indicates that a similar image does not exist (S509: NO), the similarity estimation unit 231 increments the value of k (step S518), and executes step S505 again.

On the other hand, if a result of the determination of step S509 indicates that a similar image exists (S509: YES), the similarity estimation unit 231 estimates that several lines preceding the similar diagram are lines whose contents are similar within the registered document B, and adds the estimation result to the similar line counter, as shown in FIG. 8 (steps S510 to S515).

The number of lines preceding and/or following the diagram that are takes as similar lines in steps S510 to S515 is defined using a constant H that is set by an administrator of the retrieval system 2 or the like. Also, in the above steps, by comparing the constant H with the first line of the document, the interval between the diagram targeted for similarity determination and the diagram immediately previous thereto, or the like, and adding the smaller of these values to the similar line counter, the value after addition being an erroneous value is avoided.

Here, steps S510 to S515 will be specifically described. First, the similarity estimation unit 231 sets the diagram similarity flag F to on (step S510). Next, the similarity estimation unit 231 determines whether at least one of the diagram information data $D_k$ and the diagram information data $Q_j$ is first in the appearance order (step S511).

If a result of the determination of step S511 indicates that at least one of $D_k$ and $Q_j$ is first in the appearance order (S511: YES), the similarity estimation unit 231 estimates that H lines preceding the diagram that is specified by the diagram information data that is first in the appearance order are lines that are similar. The similarity estimation unit 231 then adds a value to the similar line counter of the document of the diagram information data that is first in the appearance order, so as to not exceed the line count from the diagram to the first line of the document (step S512). Note that "H" is a preset constant and represents a line count.

Specifically, the similarity estimation unit 231 executes one or both of the following arithmetic equations (1) and (2) at step S512. Note that, in the following arithmetic equations (1) and (2), "min" is a function. For example, assuming min (V1, V2), the smaller value of V1 and V2 of min(V1, V2) is returned, and if V1 and V2 are the same value, that value is returned. Also, "G" denotes the appearance position of the diagram (line number of the diagram; see FIG. 6) included in the diagram information data. $D(G)_k$ indicates the appearance position of the diagram information data $D_k$, and $Q(D)_j$ indicates the appearance position of the diagram information data $Q_j$.

$$C_a \leftarrow C_a + \min(D(G)_k - 1, H) + 1 \quad \text{Arithmetic equation (1)}$$

$$C_b \leftarrow C_b + \min(Q(G)_j - 1, H) + 1 \quad \text{Arithmetic equation (2)}$$

If a result of the determination of step S511 indicates that at least one of $D_k$ and $Q_j$ is not first in the appearance order (S511; NO), or in the case where step S512 has been executed, the similarity estimation unit 231 determines whether the diagram similarity flag $E_{j-1}$ is on (step S513).

If a result of the determination of step S513 indicates that the diagram similarity flag $E_{j-1}$ is on (S513; YES), the similarity estimation unit 231 estimates that H lines preceding the diagram that is specified by the diagram information data $Q_j$ of the registered document B are similar lines. The similarity estimation unit 231 then adds a value to the similar line counter $C_b$ of the registered document B, so as to not exceed a value obtained by adding H to the interval between the diagram that is specified by the diagram information data $Q_j$ and the diagram previous thereto (step S514).

Specifically, the similarity estimation unit 231 executes the following arithmetic equations (3) and (4) at step S514. Note that in the case where a value has already been added to the similar line counter $C_b$ by step S512, step S513 is omitted.

$$X \leftarrow \min(Q(G)_j - Q(G)_{j-1} - 1, H) \quad \text{Arithmetic equation (3)}$$

$$C_b \leftarrow C_b + \min(Q(G)_j - (Q(G)_{j-1} + X) - 1, H) + 1 \quad \text{Arithmetic equation (4)}$$

If a result of the determination of step S513 indicates that the diagram similarity flag $E_{j-1}$ is not on (S513: NO), or in the case where step S514 has been performed, the similarity estimation unit 231 executes step S515.

At step S515, the similarity estimation unit 231 estimates that H lines preceding both the diagram that is specified by the diagram information data $D_k$ of the designated document A and the diagram that is specified by the diagram information data $Q_j$ of the registered document B are similar lines. The similarity estimation unit 231 then adds a value to the similar line counter of both documents, so as to not exceed the interval between the diagram that is specified by the diagram information data and the diagram previous thereto (step S515).

Specifically, the similarity estimation unit 231 executes the following arithmetic equations (5) and (6) at step S515. Note that in the case where a value has already been added to the similar line counters by step S512 or S514, step S515 is skipped.

$$C_a \leftarrow C_a + \min(D(G)_k - D(G)_{k-1} - 1, H) + 1 \quad \text{Arithmetic equation (5)}$$

$$C_b \leftarrow C_b + \min(Q(G)_j - Q(G)_{j-1} - 1, H) + 1 \quad \text{Arithmetic equation (6)}$$

Next, after the end of step S515, the similarity estimation unit 231 sets the diagram similarity flag $E_j$ to on (step S516). Thereafter, the similarity estimation unit 231 increments the value of j (step S517) and further increments the value of k (step S518), before executing step S505 again, as shown in FIG. 7. The data for performing the next similarity determination is updated by steps S516 to S518.

Figure 9:
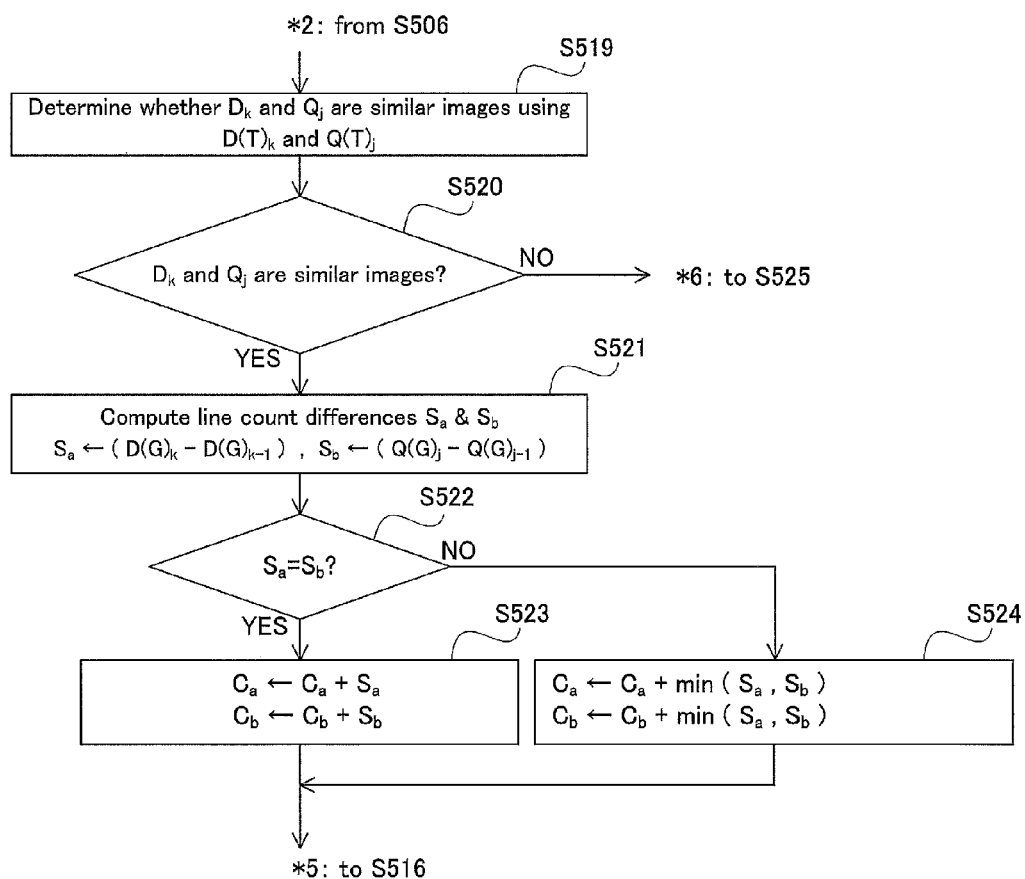
FIG. 9 is a flowchart showing details of similarity estimation processing shown in FIG. 3.
Figure 10:
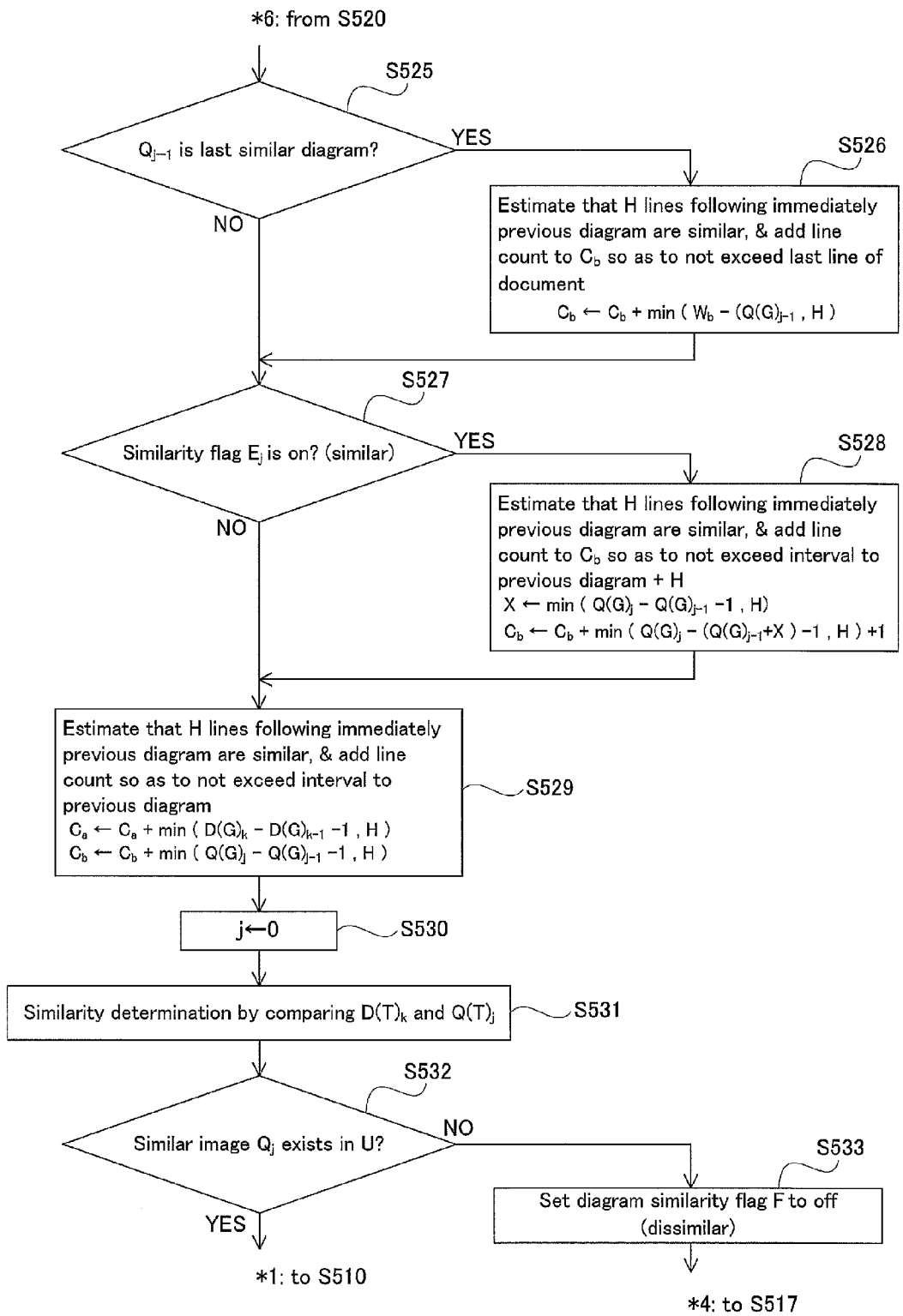
FIG. 10 is a flowchart showing details of similarity estimation processing shown in FIG. 3.

Also, if a result of the determination of step S506 indicates that the diagram similarity flag F is not set to off (S506: NO), the similarity estimation unit 231 compares $D(T)_k$ with $Q(T)_j$, as shown in FIG. 9 (step S519).

Next, the similarity estimation unit 231 determines whether the diagram that is specified by the diagram information data $D_k$ and the diagram that is specified by the diagram information data $Q_j$ are similar, based on the comparison result of step S519 (step S520).

If a result of the determination of step S520 indicates that the diagrams are similar (S520: YES), step S521 discussed later is executed. On the other hand, if a result of the determination of step S520 indicates that the diagrams are not similar (S520: NO), the similarity estimation unit 231 executes step S525 shown in FIG. 10.

At step S525, the similarity estimation unit 231 determines whether the diagram that is specified by the diagram information data $Q_{j-1}$ is the last diagram that is similar. If a result of the determination of step S525 indicates that the diagram is the last diagram (S525: YES), the similarity estimation unit 231 estimates that H lines following the diagram that is specified by the diagram information data $Q_{j-1}$ of the registered document B are similar lines. The similarity estimation unit 231 then adds a value to the similar line counter $C_b$ of the registered document B, so as to not exceed the line count from the diagram that is specified by the diagram information data $Q_{j-1}$ to the last line of the document (step S526).

Specifically, the similarity estimation unit 231 executes the following arithmetic equation (7) at step S526. Note that in the following arithmetic equation (7), $W_b$ indicates the total line count of the registered document B.

$$C_b \leftarrow C_b + \min(W_b - (Q(G)_{j-1}, H)) \qquad \text{Arithmetic equation (7)}$$

If a result of the determination of step S525 indicates the diagram is not the last diagram (S525: NO), or in the case where step S526 has been executed, the similarity estimation unit 231 executes step S527.

At step S527, the similarity estimation unit 231 determines whether diagram similarity flag $E_j$ is set to on. If a result of the determination of step S527 indicates that the diagram similarity flag $E_j$ is set to on, the similarity estimation unit 231 estimates that H lines following the diagram that is specified by the diagram information data $Q_{j-1}$ of the registered document B are similar lines. The similarity estimation unit 231 then adds a value to the similar line counter $C_b$ of the registered document B, so as to not exceed a value obtained by adding H to the interval between the diagram that is specified by the diagram information data $Q_{j-1}$ and the diagram that is specified by the diagram information data $Q_j$ (step S528).

Specifically, the similarity estimation unit 231 executes the following arithmetic equations (8) and (9) at step S528. Note that the following arithmetic equations (8) and (9) are similar arithmetic equations to the above-mentioned arithmetic equations (3) and (4). Also, in the case where a value has already been added to the similar line counter $C_b$ by step S526, step S528 for the similar line counter that has had a valued added thereto is omitted.

$$X \leftarrow \min(Q(G)_j - Q(G)_{j-1} - 1, H) \qquad \text{Arithmetic equation (8)}$$

$$C_b \leftarrow C_b + \min(Q(G)_j - (Q(G)_{j-1} + X) - 1, H) + 1 \qquad \text{Arithmetic equation (9)}$$

If a result of the determination of step S527 indicates that the diagram similarity flag $E_j$ is not set to on, or in the case where step S528 has been executed, the similarity estimation unit 231 executes step S529.

At step S529, the similarity estimation unit 231 estimates that H lines following both the diagram that is specified by the diagram information data $D_{k-1}$ of the designated document A and the diagram that is specified by the diagram information data $Q_{j-1}$ of the registered document B are similar lines. The similarity estimation unit 231 then adds a value to the similar line counter of both documents, so as to not exceed the interval between the diagram that is specified by the diagram information data and the diagram subsequent thereto (step S529).

Specifically, the similarity estimation unit 231 executes the following arithmetic equations (10) and (11) at step S529. Note that in the case where a value has already been added to the similar line counters by step S526 or S528, step S529 for the similar line counter that has had a value added thereto is omitted.

$$C_a \leftarrow C_a + \min(D(G)_k - D(G)_{k-1} - 1, H) \qquad \text{Arithmetic equation (10)}$$

$$C_b \leftarrow C_b + \min(Q(G)_j - Q(G)_{j-1} - 1, H) \qquad \text{Arithmetic equation (11)}$$

Next, after execution of step S529, the similarity estimation unit 231 sets the value of the variable j to 0 (zero) (step S530). Next, the similarity estimation unit 231 compares $D(T)_k$ with $Q(T)_j$, in order to determine the similarity between the diagram of the designated document A and the diagram of the registered document B (step S531).

Next, the similarity estimation unit 231 determines whether an image (diagram information data $Q_i$) that is similar to the diagram of the designated document A exists in the managed data list U of the registered document B, based on the comparison result of step S531 (step S532).

If a result of the determination of step S532 indicates that an image that is similar exists (S532: YES), the similarity estimation unit 231 executes step S510 shown in FIG. 8. On the other hand, if a result of the determination of step S532 indicates that an image that is similar does not exist (S532: NO), the similarity estimation unit 231 sets the diagram similarity flag F to off, and thereafter executes steps S517 and S518 shown in FIG. 7, before executing step S505 again.

The case where NO is determined in steps S506 and S520 thus corresponds to the case where the diagram of the designated document A and the diagram of the registered document B that are targeted for similarity determination are not similar images, and the immediately previous diagram is the sole similar image in the registered document B. B61 in FIG. 12 shows this case. Thus, as a result of the abovementioned step S520 and S525 to S533, it is estimated that several lines following a diagram that is similar are lines whose contents are similar within the registered document, and the estimation result is added to the similar line counter. Also, by comparing the constant H with the last line of the document, the interval between a diagram targeted for similarity determination and the immediately previous diagram, or the like, and adding the smaller of these values to the similar line counter, the value after addition being an erroneous value is avoided.

On the other hand, given that consecutive diagrams are similar in the case where YES is determined in step S520 after NO being determined in step S506, it is estimated that the flow of narrative in each document between these two diagrams is similar. Because it may, however, be the case that only the flow of narrative is similar while the degree of detail (amount of information) of the narrative is different between the documents, it cannot be estimated at this point that the contents are similar. In view of this, the similarity estimation unit 231 executes steps S521 to S524.

Here, steps S521 to S524 will be specifically described. If a result of the determination of step S520 indicates that the diagram that is specified by the diagram information data $D_k$ and the diagram that is specified by the diagram information data $Q_j$ are similar (S520: YES), first, the similarity estimation unit 231 computes the difference in line count between the two diagrams as the interval between the consecutive diagrams in each document, as shown in FIG. 9, in order to compare the information amount of the contents of both documents (step S521).

Specifically, the similarity estimation unit 231 executes the following arithmetic equations (12) and (13) at step S521. In arithmetic equation (12), $S_a$ indicates the interval between the consecutive diagrams in the designated document A. In arithmetic equation (13), $S_b$ indicates the interval between the consecutive diagrams in the registered document B.

$$S_a \leftarrow (D(G)_k - D(G)_{k-1}) \quad \text{Arithmetic equation (12)}$$

$$S_b \leftarrow (Q(G)_j - Q(G)_{j-1}) \quad \text{Arithmetic equation (13)}$$

Next, the similarity estimation unit 231 determines whether the differences in line count in both documents match ($S_a = S_b$) (step S522). If a result of the determination of step S522 indicates that differences in line count match (S522: YES), it can be estimated that the designated document A and the registered document B are similar with regard to the contents between the two diagrams, given that not only the flows of narrative but also the information amounts of the sentences is the same. B62 in FIG. 12 indicates this state. In view of this, the similarity estimation unit 231 adds the differences in line count to the similar line counters (step S523).

Specifically, the similarity estimation unit 231, at step S523, executes the following arithmetic equations (14) and (15).

$$C_a \leftarrow C_a + S_a \quad \text{Arithmetic equation (14)}$$

$$C_b \leftarrow C_b + S_b \quad \text{Arithmetic equation (15)}$$

On the other hand, if a result of the determination of step S522 indicates that the differences in line count do not match (S522: NO), it can be estimated that the sentences with the greater information amount encompasses the contents of the sentences with the lesser information amount, given that the flows of the narrative are the same but the information amounts differ. B63 in FIG. 12 indicates this state. In view of this, the similarity estimation unit 231 adds the smaller difference in line count to the similar line counters (step S524).

Specifically, the similarity estimation unit 231, at step S524, executes the following arithmetic equations (16) and (17).

$$C_a \leftarrow C_a + \min(S_a, S_b) \quad \text{Arithmetic equation (16)}$$

$$C_b \leftarrow C_b + \min(S_a, S_b) \quad \text{Arithmetic equation (17)}$$

After execution of step S523 or S524, the similarity estimation unit 231 sets the diagram similarity flag $E_j$ to on (step S516). Thereafter, the similarity estimation unit 231 increments the value of j (step S517), and further increments the value of k (step S518), before executing step S505 again, as shown in FIG. 7.

On the other hand, in the abovementioned case where the immediately previous pieces of diagram information match (S506: NO), and the diagrams that are next in order in the designated document and the registered document are dissimilar (S520: NO), the continuity of similarity of the contents is interrupted here. The abovementioned steps S525 to S529 are thus executed, and several lines following the similar diagram are estimated to be lines whose contents are similar within the registered document B, and are added to the similar line counters (S525 to S529).

It may, however, be the case that other similar images exist but that the order of the diagrams is different. B64 in FIG. 12 indicates this state. The abovementioned steps S530 to S532 are thus executed. The diagrams of the designated document A are thereby compared with the diagrams of the registered document B, and if a similar diagram exists, it is again investigated whether there are consecutive diagrams that are similar. If a similar diagram does not exist (S532: NO), step S533 is executed and the diagram similarity flag F for determining whether the diagrams matched last time is set to off.

Figure 11:
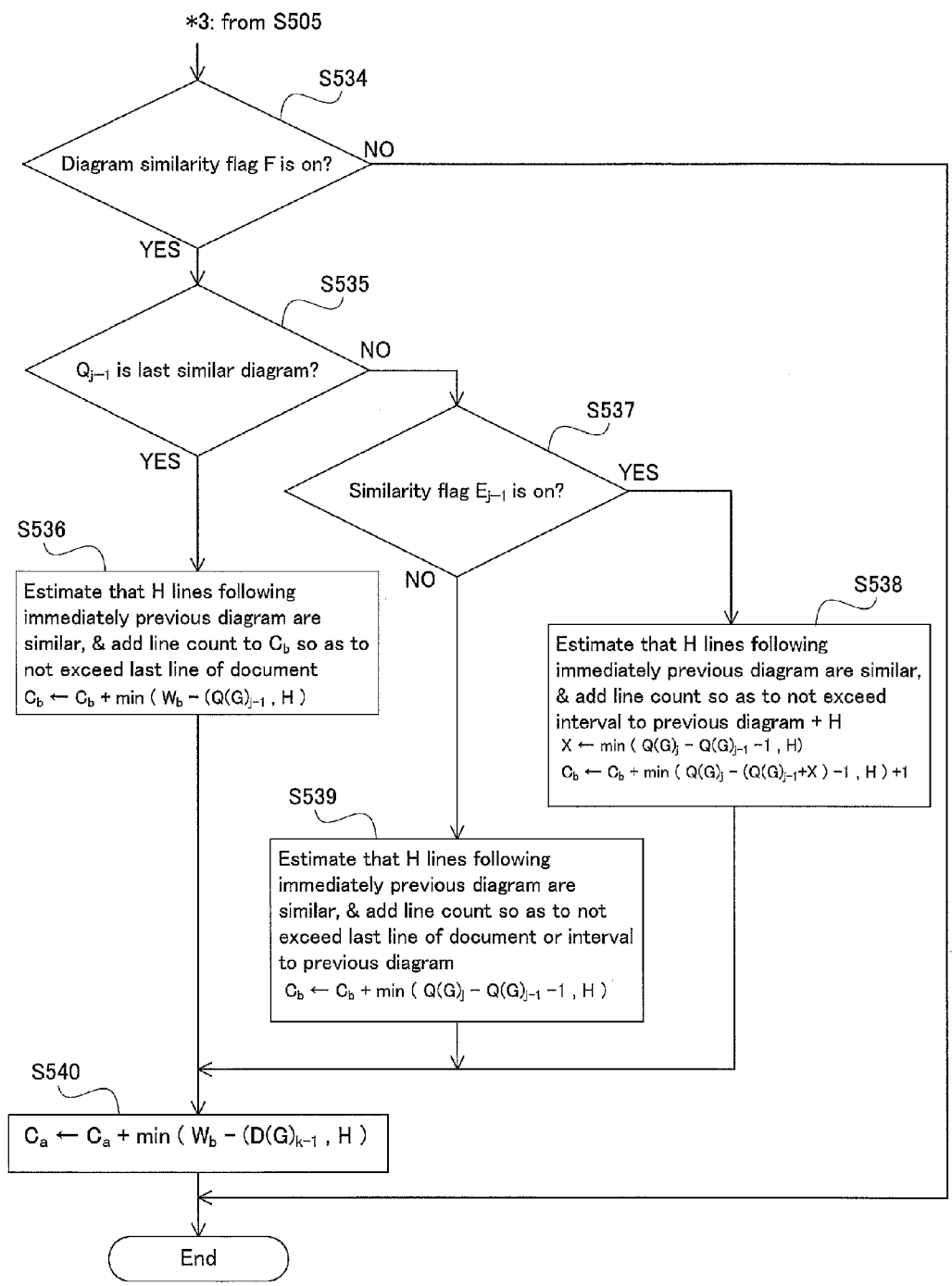
FIG. 11 is a flowchart showing details of similarity estimation processing shown in FIG. 3.

The processing of the above steps S501 to S533 is performed on the diagram information data of all diagrams included in the designated document A. If a result of the determination of step S505 indicates that the data $D_k$ does not exist (S505: NO), the similarity estimation unit 231 determines whether the diagram similarity flag F is set to on, as shown in FIG. 11 (step S534).

If a result of the determination of step S534 indicates that the diagram similarity flag F is not set to on (S534: NO), the similarity estimation unit 231 ends the processing. On the other hand, if a result of the determination of step S534 indicates that the diagram similarity flag F is set to on (S534: YES), the similarity estimation unit 231 determines whether the diagram that is specified by the diagram information data $Q_{j-1}$ is the last diagram that is similar (step S535).

If a result of the determination of step S535 indicates that the diagram is the last diagram (S535: YES), the similarity estimation unit 231 estimates that H lines following the diagram that is specified by the diagram information data $Q_{j-1}$ of the registered document B are similar lines. The similarity estimation unit 231 then adds a value to the similar line counter $C_b$ of the registered document B, so as to not exceed the line count from the diagram that is specified by the diagram information data $Q_{j-1}$ to the last line of the document (step S536).

Specifically, the similarity estimation unit 231 executes the following arithmetic equation (18) at step S536. Note that the following arithmetic equation (18) is a similar arithmetic equation to the abovementioned arithmetic equation (7).

$$C_b \leftarrow C_b + \min(W_b - (Q(G)_{j-1}, H)) \quad \text{Arithmetic equation (18)}$$

On the other hand, if a result of the determination of step S535 indicates that the diagram is not the last diagram (S525: NO), the similarity estimation unit 231 determines whether the diagram similarity flag $E_{j-1}$ is set to on (step S537).

If a result of the determination of step S537 indicates that the diagram similarity flag $E_{j-1}$ is set to on (S537: YES), the similarity estimation unit 231 estimates that H lines following the diagram that is specified by the diagram information data $Q_{j-1}$ of the registered document B are similar lines. The similarity estimation unit 231 then adds a value to the similar line counter $C_b$ of the registered document B, so as to not exceed a value obtained by adding H to the interval between the diagram that is specified by the diagram information data $Q_{j-1}$ and the diagram that is specified by the diagram information data $Q_j$ (step S538).

Specifically, the similarity estimation unit 231 executes the following arithmetic equations (19) and (20) at step S538. Note that the following arithmetic equations (19) and (20) are similar arithmetic equations to the above-mentioned arithmetic equation (8) and (9).

$$X \leftarrow \min(Q(G)_j - Q(G)_{j-1} - 1, H) \quad \text{Arithmetic equation (19)}$$

$$C_b \leftarrow C_b + \min(Q(G)_j - (Q(G)_{j-1} + X) - 1, H) + 1 \quad \text{Arithmetic equation (20)}$$

On the other hand, the similarity estimation unit 231 also estimates that H lines following the diagram that is specified by the diagram information data $Q_{j-1}$ of the registered document B are similar lines, if a result of the determination of step S537 indicates that the diagram similarity flag $E_{j-1}$ is not set to on (S537: NO). The similarity estimation unit 231, however, adds a value to the similar line counter $C_b$ of the registered document B, so as to not exceed the interval between the diagram that is specified by the diagram information data $Q_{j-1}$ and the diagram that is specified by the diagram information data $Q_j$, or the last line of the registered document B. (step S539).

Specifically, the similarity estimation unit 231 executes the following arithmetic equation (21) at step S539.

$$C_b \leftarrow C_b + \min(Q(G)_j - Q(G)_{j-1} - 1, H) \qquad \text{Arithmetic equation (21)}$$

Next, after execution of step S536 or S539, the similarity estimation unit 231 adds a value to the similar line counter $C_a$ of the designated document A, so as to not exceed the line count from the diagram that is specified by the diagram information data $D_{k-1}$ to the last line of the document (step S540).

Specifically, the similarity estimation unit 231 executes the following arithmetic equation (22) at step S540. Note that in the following arithmetic equation (22), $W_a$ indicates the total line count of the designated document A.

$$C_a \leftarrow C_a + \min(W_b - (D(G)_{k-1}, H)) \qquad \text{Arithmetic equation (22)}$$

After execution of step S540, the similarity estimation unit 231 ends the processing. Also, the processing of steps S501 to S540 shown in FIG. 7 to FIG. 11 is performed on a single registered document, and is repeatedly executed for the number of registered documents. As a result, the similarity estimation unit 231 is able to derive the number of similar lines in each registered document B, using the diagram information data lists of the registered documents B and the diagram information data list of the designated document A as arguments, for all of the registered documents B in the diagram information table.

Also, the similarity estimation server 23 transmits the values of the similar line counters $C_a$ and $C_b$ to the scoring server 22. Note that, in the present embodiment, the values of the similar line counters $C_a$ and $C_b$ correspond to the "similarity" between the designated document A and the registered documents B.

Also, the similarity estimation server 23 also transmits the respective values of the total line count for the designated document A and the registered documents B to the scoring server 22, in addition to the values of the similar line counters $C_a$ and $C_b$. Further, a configuration can also be adopted in which the similarity estimation server 23 does not transmit the value of the similar line counter $C_b$, with regard to a registered document whose similar line counter $C_b$ is 0 (zero) (registered document which does not have any similar images), so as to not display needless information in the ranking result of step A4. Steps A4 and A5 are executed after transmission of the values of the similar line counters $C_a$ and $C_b$, and the like.

Apparatus Operation>Search Phase>Step A4 and A5

In the scoring server 22, the scoring unit 221, on receiving the values of similar line counters $C_a$ and $C_b$, computes a similarity score S(A, B) of the similarity with the designated document A, for each registered document B, using these values.

Specifically, the scoring unit 221 computes the similarity score S(A, B) of the similarity between each registered document B and the designated document A, for every registered document, using the following equation (1). In the following equation (1), F(A, B) is the similarity score of the registered document B and the designated document A obtained by an existing similar document retrieval technique. Also, α is a weight coefficient.

$$S(A, B) = F(A, B) + \alpha \frac{C_a + C_b}{W_a + W_b} \qquad \text{Equation 1}$$

Also, the scoring server 22 transmits the computed similarity score S(A, B) for every registered document to the search server 21 (see FIG. 2).

Next, once the search server 21 has received the similarity score S(A, B) for every registered document, the search result output unit 211 creates screen data of the search result 12 (see FIG. 2), so that registered documents having a high similarity score S(A, B) are ranked higher, and returns the created screen data to the search terminal 1.

As described above, in the present embodiment, the similarity is evaluated with the two indices of the order of the diagrams and the interval between the diagrams, in addition to the feature amounts of images, and processing is performed so that the number of similar lines that influences the similarity score increases, the greater the degree of matching in the order of the diagrams and the interval (line count) between the diagrams. Thus, according to the present embodiment, the accuracy of the similarity determination can be further enhanced, compared with the case where the similarity is simply estimated with only the feature amounts of images.

Note that the equation for computing the similarity score shown in the above equation (1) is merely an example for computing the similarity score, and other computation equations may be employed in the present embodiment. For example, the computation equation may consist of only the first element (F(A, B)) of the above equation (1), or may be only the second element ($\alpha*(C_a+C_b)/(W_a+W_b)$) of the above equation (1). Further, the computation equation may be constituted by elements other than these. Also, although the scoring unit 221 does not compute what percentage of an entire registered document is similar in the abovementioned example, in the present embodiment, the scoring unit 221 may compute such a rate and display the computed rate on the screen of the search terminal 1. Note that computation of such a rate can be performed by dividing the value of the similarity score of each registered document by the maximum similarity score.

Apparatus Operation: Update Phase

Figure 13:
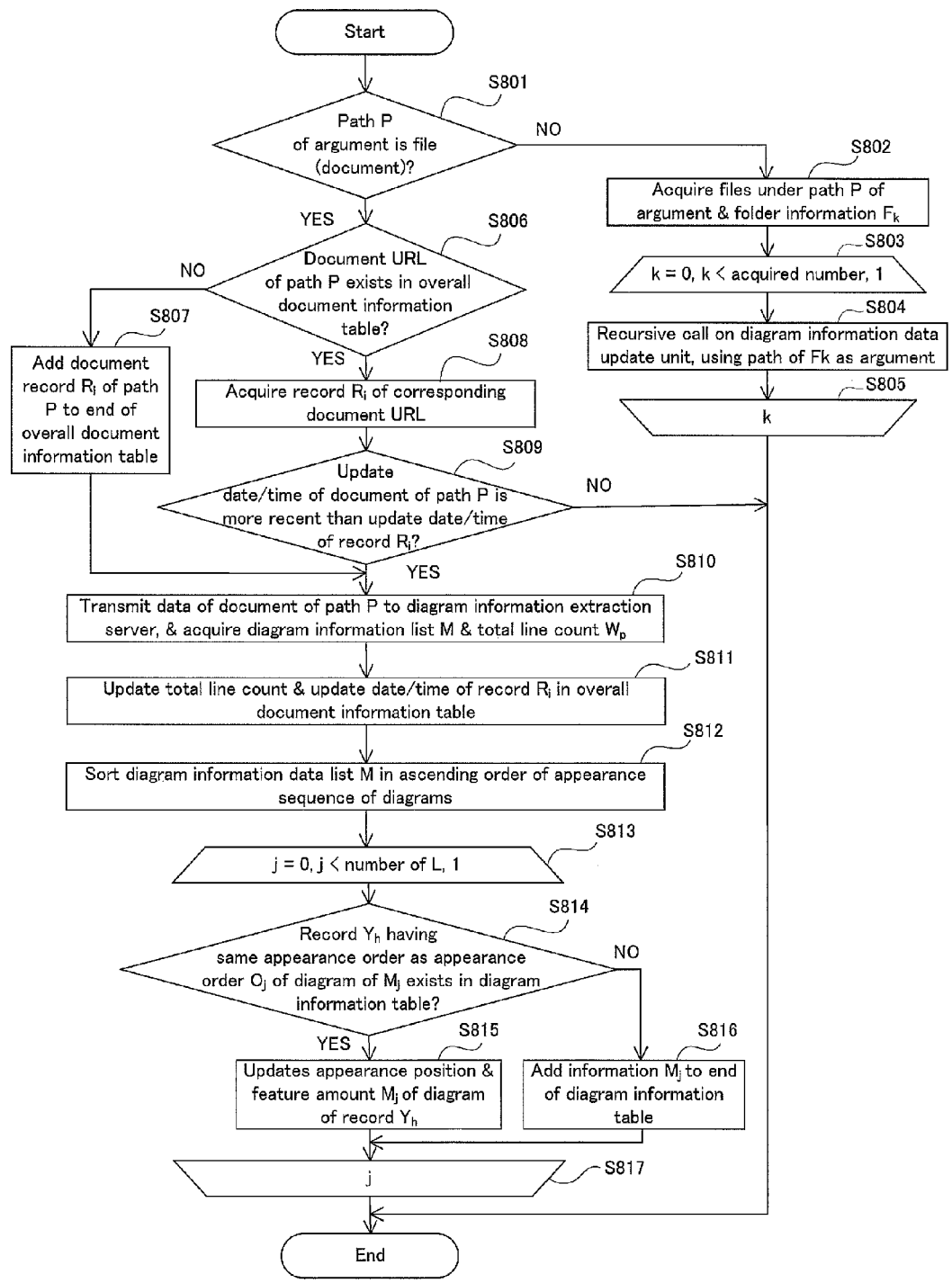
FIG. 13 is a flowchart showing operations in an update phase of a retrieval apparatus in an embodiment of the present invention.

Next, an update phase for updating the data of the diagram information database will be described using FIG. 13. FIG. 13 is a flowchart showing operations in the update phase of the retrieval apparatus in the embodiment of the present invention.

In the update phase, the similarity estimation server 23 operates the data update unit 233, based on an update timing determined by an administrator of the retrieval system 2 or the like.

As shown in FIG. 13, first, the data update unit 233 investigates if a path P of the argument is one of a file (document) and a folder (step S801). If a result of the determination of step S801 indicates that the path of the argument is not a file (path is a folder; S801: NO), the data update unit 233 acquires the files under the folder that is the path and folder information $F_k$. $F_k$ indicates the k-th piece of folder information that is under the folder of the argument P.

Next, the data update unit 233 repeatedly recursive calls itself (steps S802 to S805), while increasing the value of k from 0 in increments of 1 so as to not exceed the acquired value, using the path of the acquired folder information $F_k$ as an argument, and thereafter ends the processing.

On the other hand, if a result of the determination of step S801 indicates that the path P of the argument is a file (document) (S801: YES), the data update unit 233 performs update processing on all files under the starting point path regardless of the folder hierarchy, using the path P of the search target server 3 as the starting point, in order to update the diagram information data.

Specifically, the data update unit 233 determines whether the document URL of the document serving as the path P is registered in the overall document information table (see FIG. 5) (step S806).

If a result of the determination of step S806 indicates that the document URL is not registered (S806: NO), the data update unit 233 adds a record $R_i$ of the document serving as the path P to the end of the overall document information table (step S807). The record $R_i$ indicates the i-th record of the overall document information table. Also, the data update unit 233 executes step S810 after execution of step S807.

On the other hand, if a result of the determination of step S806 indicates that the document URL is registered (S806: YES), the data update unit 233 acquires the record $R_i$ of the document URL of the document serving as the path P (step S808). The data update unit 233 then determines whether the update date and time of the document serving as the path P is more recent than the update date and time of the record $R_i$ acquired at step S808 (step S809).

If a result of the determination of step S809 indicates that the update date and time of the document serving as the path P is not more recent than the update date and time of the record $R_i$ acquired at step S808 (S809: NO), the data update unit 233 ends the processing.

On the other hand, if a result of the determination of step S809 indicates that the update date and time of the document serving as the path P is newer than the update date and time of the record $R_i$ acquired at step S808 (S809: YES), the data update unit 233 executes step S810.

Next, at step S810, in order to add information to or correct the diagram information table, first, the data update unit 233 transmits the document data of the document serving as the path P to the diagram information extraction server 24, and starts up the diagram information extraction unit 241. The data update unit 233 then causes the diagram information extraction unit 241 to acquire a diagram information data list M and a total line count $W_p$ of the document serving as the argument P, and transmit the acquired information to the similarity estimation server 23. Note that the diagram information data list M includes diagram information data $M_j$, and $M_j$ indicates the j-th piece of diagram information data included in the diagram information data list M.

Next, the data update unit 233 updates the update date and time and the total line count of the record $R_i$ registered in the overall document information table (see FIG. 5), using the information acquired at step S810 (step S811).

Next, the data update unit 233 sorts the diagram information data $M_j$ included in the diagram information data list M in ascending order of the appearance order of the diagrams (step S812).

Next, the data update unit 233 repeatedly executes steps S814 to S816, while increasing the value of j from 0 in increments of 1, so as to not exceed the number of pieces of diagram information data included in the diagram information data list M, and thereafter ends the processing.

Specifically at step S814, the data update unit 233 determines whether a record $Y_h$ having the same appearance order as the appearance order $O_j$ of the diagram information data $M_j$ exists in the diagram information table. Note that the record $Y_h$ indicates the h-th record in the diagram information table.

If a result of the determination of step S814 indicates that a record $Y_h$ with same appearance order exists (S814: YES), the data update unit 233 updates the appearance position (line number) and the feature amount of the diagram in the record $Y_h$ using the diagram information data $M_j$ (step S815).

On the other hand, if a result of the determination of step S814 indicates that a record $Y_h$ with the same appearance order does not exist (S814: NO), the data update unit 233 adds the diagram information data $M_j$ to the end of the diagram information table (step S816).

Execution of steps S801 to S817 completes the update processing of the diagram information database 232 using the search target server 3.

As described above, according to this embodiment, since diagram information specifying images in a document is focused on, the similarity can be evaluated without being influenced by the description language or the wording of complex sentences. Also, in the present embodiment, because similarity is evaluated, targeting a plurality of diagram information that are dotted throughout a document, similar document retrieval that takes the contents of an entire document into consideration with only diagram information can be performed. Additionally, in the present embodiment, because evaluation of similarity that takes the contents of the document into consideration, rather than evaluation simply using only the image information of diagrams, can be performed, using new comparative indices such as the sequence of diagrams and the interval between diagrams, similar document retrieval that looks in-depth at the contents of a document desired by a person doing a search using diagram information is realized.

The present invention is not limited to the above embodiment, and can be implemented in various other forms, within a scope that do not depart from the gist of the invention. The above embodiment is thus merely by way of illustration in all respects, and is not intended to be interpreted restrictively. The order of the abovementioned processing steps can be arbitrarily changed within a range that does not result in inconsistency, or the processing steps can be executed in parallel.

Also, in the present embodiment, the accuracy of values can be further enhanced though the appearance position of diagrams extracted from a document being taken as positions from which lines that include comments have been omitted. Also, because specification of diagrams determined to be similar by the similarity estimation unit 231 is facilitated by providing the retrieval apparatus (retrieval system) 2 with a mechanism for separately holding image data extracted from the document, images of diagrams that are similar can be displayed as thumbnails on the ranking of the search result. For example, on the right side of FIG. 14B, an example is shown in which thumbnails of similar images are displayed together with the search results. In this case, use of an application program for creating animation enables retrieved diagrams to also be displayed in the form of a frame-by-frame animation, rather than only as individual diagrams (images).

Further, although the line count is used as a basis for the similarity score in the abovementioned example, the present embodiment may be configured such that a page count is used as the appearance position that is extracted, and a score is computed by a computation method that depends on how many of the total number of pages are similar. This embodiment is useful in document retrieval in which it is desired to place importance on the concept of a page.

At the time of extracting the appearance position from a document, information such as chapters and paragraphs within the document may also be extracted, and this information may also be registered in the diagram information table of the diagram information database 232 together with the appearance position. In this case, the similarity estimation unit 231, when determining whether consecutive diagrams are similar, is able to execute processing for determining whether consecutive diagrams are similar across paragraphs or chapters, and, if similar, not adding the lines existing between the diagrams as the number of similar lines. As a result, computation of the similarity score that takes the structure of chapters and paragraphs within a document into consideration is possible.

Also, although, in the abovementioned example, the document data of the designated document is input to the retrieval system 2 as a search condition, the present embodiment is not limited thereto. In the present embodiment, documents whose document URL is registered in the diagram information database 232 may be taken as search conditions, rather than input of the document data from the search terminal 1 being performed, and similar document retrieval between these registered documents may be performed. This embodiment can be used to find out how many similar documents there are in the database.

Further, in the present embodiment, since flags for managing whether each diagram in the registered document and each diagram in the designated document are similar are held, the similarity estimation unit 231, in the case where the designated document includes a plurality of pieces of the same diagram information data, it is possible to avoid performing the similarity determination again with regard to the same diagram information data.

Additionally, in the present embodiment, the diagram information extraction unit 241 can also utilize diagram numbers and the titles of diagrams, in the processing for specifying the position of diagrams (step S205). For example, assume that, in lines preceding and/or following image information, character strings representing the contents of diagrams, such as character strings ending with diagram numbers and nouns, like a character string ending in "-ion" or "-ing" in English, for example, are described with one line. In this case, the diagram information extraction unit 241 is able to determine that an image is a diagram and that diagram information can be extracted, based on character strings.

Program

A program in the embodiment of the present invention may be any program for causing a computer to execute steps A1 to A5 shown in FIG. 3. The retrieval apparatus 2 and the retrieval method in the present embodiment can be realized by installing this program on a computer and executing the program. In this case, a CPU (Central Processing Unit) of the computer functions as the data receiving unit 212, the diagram information extraction unit 241, the similarity estimation unit 231, the scoring unit 221 and the search result output unit 211, and performs processing.

Also, in the case where the retrieval apparatus 2 is the retrieval system shown in FIG. 2, the program in the present embodiment may be constituted by a plurality of programs that are respectively for each of steps A1 to A5. In this case, each program is installed on a different computer and executed.

Figure 15:
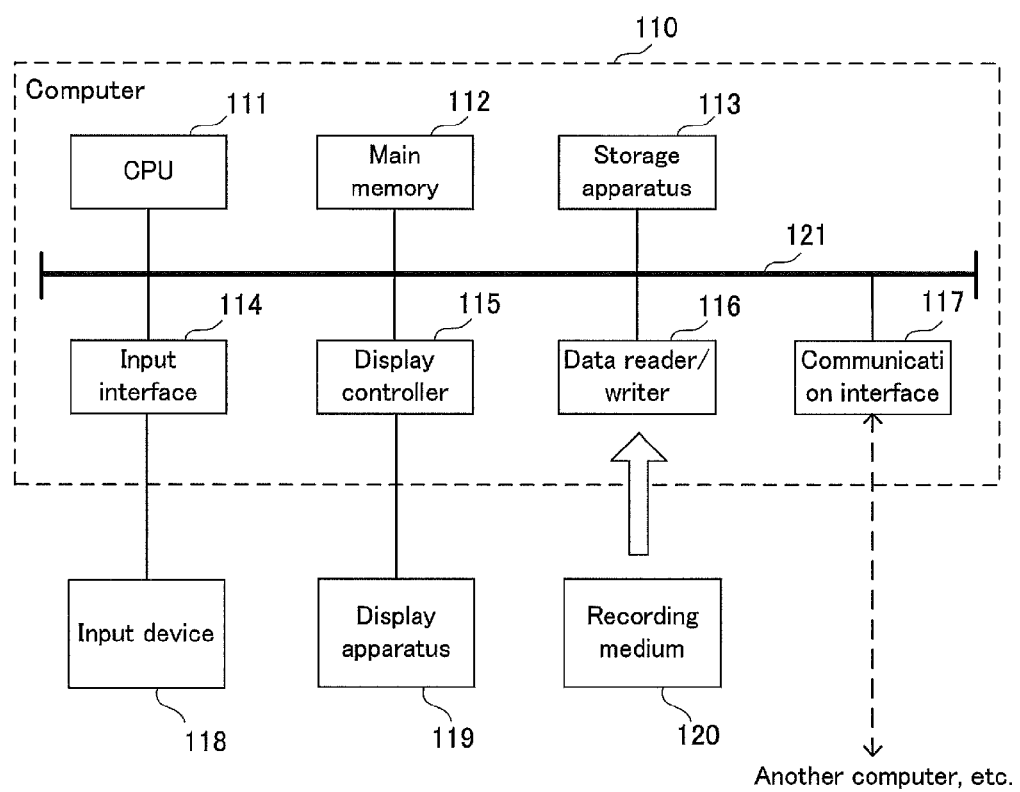
FIG. 15 is a block diagram showing an example of a computer for realizing a retrieval apparatus in an embodiment of the present invention.

Here, a computer that realizes the retrieval apparatus by executing the program in the present embodiment will be described using FIG. 15. FIG. 15 is a block diagram showing an example of a computer that realizes the retrieval apparatus in the embodiment of the present invention. Note that in the case where the retrieval apparatus 2 is the retrieval system shown in FIG. 2, a plurality of the computer shown in FIG. 15 will be used.

As shown in FIG. 15, the computer 110 is provided with a CPU 111, a main memory 112, a storage apparatus 113, an input interface 114, a display controller 115, a data reader/writer 116, and a communication interface 117. These components are connected to each other via a bus 121 so as to enable data communication.

The CPU 111 implements various types of arithmetic operations, by expanding the programs (codes) of the present embodiment that are stored in the storage apparatus 113 in the main memory 112, and executing these programs in a prescribed order. Typically, the main memory 112 is a volatile storage apparatus such as a DRAM (Dynamic Random Access Memory).

Also, the programs in the present embodiment are provided in a state of being stored on a computer-readable recording medium 120. Note that the programs in the present embodiment may be programs that circulate on the Internet connected via the communication interface 117.

Also, apart from a hard disk drive, specific examples of the storage apparatus 113 include a semiconductor memory apparatus such as a flash memory. The input interface 114 mediates data transmission between the CPU 111 and an input device 118 such as a keyboard and a mouse. The display controller 115 is connected to a display apparatus 119, and controls display on the display apparatus 119.

The data reader/writer 116 mediates data transmission between the CPU 111 and the recording medium 120, and executes reading of programs from the recording medium 120 and writing of processing results of the computer 110 to the recording medium 120. The communication interface 117 mediates data transmission between the CPU 111 and other computers.

Also, specific examples of the recording medium 120 include a general-purpose semiconductor memory apparatus such as CF (Compact Flash (registered trademark)) or SD (Secure Digital), a magnetic storage medium such as a flexible disk, and an optical storage medium such as a CD-ROM (Compact Disk Read Only Memory).

The present invention can, for example, be utilized in a similar document retrieval system having document information written in various languages, a similar document retrieval system that is used by people worldwide, a similar document retrieval system that targets documents in which images are heavily used such as product introduction material, and other information processing systems.

While the invention has been particularly shown and described with reference to an exemplary embodiment thereof, the invention is not limited to this embodiment. It will be understood by those of ordinary skill in the art that various changes in form and details may be made therein without departing from the spirit and scope of the present invention as defined by the claims.

What is claimed is:

1. A retrieval apparatus comprising a Central Processing Unit (CPU), the CPU comprising:
    a search server that receives data comprising a search condition, wherein the search condition comprises a designated document designated by a person doing a search;
    a diagram information extraction server that extracts diagram information from image data of diagrams dotted throughout data of the designated document, wherein the diagram information comprises a feature amount of a diagram included in the designated document, an appearance order of the diagram, and an appearance position of the diagram;

a similarity estimation server that compares the extracted diagram information with diagram information of a registered document that is registered in advance, and estimates a similarity between the data and the registered document;

a scoring server that generates a search result capable of specifying a similar document that is related to the data, based on the estimated degree of similarity;

a diagram information database storing diagram information of the registered document;

wherein the similarity estimation server specifies a specified diagram that is similar in the designated document and the registered document, based on a result of the comparison; further estimates lines that are similar between both documents, on a basis of the specified diagram; and takes a line count of the estimated lines as the similarity estimated between the data and the registered document; and wherein the CPU further comprises a data update server that acquires data of the registered document from a database in which the registered document is stored, causes the diagram information extraction server to extract diagram information from the acquired data of the registered document, and updates the contents of the diagram information database, using the extracted diagram information.

2. The retrieval apparatus according to claim 1, wherein the scoring server computes, for every registered document, a similarity score indicating a degree of similarity between the registered document and the designated document, based on the line count of the lines estimated by the similarity estimation server, as the search result.

3. A retrieval method comprising the steps of:

receiving data to serve as a search condition, wherein the search condition includes a designated document designated by a person doing a search;

extracting diagram information included in the data, wherein the diagram information comprises a feature amount of a diagram included in the document, an appearance order of the diagram, and an appearance position of the diagram;

comparing the diagram information extracted in the step (b) with diagram information of a registered document that is registered in advance, specifying a diagram that is similar in the designated document and the registered document, estimating lines that are similar between the designated document and the registered document; and taking a count of the estimated lines as an estimated a similarity between the data and the registered document; and generating a search result capable of specifying a similar document that is related to the data, based on the estimated similarity, and acquiring data of the registered document from a database in which the registered document is stored, extracting diagram information from the acquired data of the registered document, and updating the contents of a diagram information database storing diagram information of the registered document, using the extracted diagram information;

wherein the steps are executed by one or a plurality of computers.

4. The retrieval method according to claim 3, wherein, in the step (d), for every registered document, a similarity score indicating a degree of similarity between the registered document and the designated document is computed, based on a line count of the lines estimated in the step (c), as the search result.

5. A non-transitory computer-readable recording medium having recorded thereon a program that includes a command for causing a computer to execute the steps of:

receiving data comprising a search condition, wherein the search condition comprises a document designated by a person doing a search;

extracting diagram information from image data of diagrams dotted throughout data of the designated document, wherein the diagram information comprises a feature amount of a diagram included in the designated document, an appearance order of the diagram, and an appearance position of the diagram;

comparing the diagram information extracted in the step (b) with diagram information of a registered document that is registered in advance, specifying a diagram that is similar in the designated document and the registered document, estimating lines that are similar between the designated document and the registered document; and taking a count of the estimated lines as an estimated a similarity between the data and the registered document; and generating a search result capable of specifying a similar document that is related to the data, based on the estimated similarity; and acquiring data of the registered document from a database in which the registered document is stored, extracting diagram information from the acquired data of the registered document, and updating the contents of a diagram information database storing diagram information of the registered document, using the extracted diagram information.

6. The non-transitory computer-readable recording medium according to claim 5, wherein, in the step (d), for every registered document, a similarity score indicating a degree of similarity between the registered document and the designated document is computed, based on a line count of the lines estimated in the step (c), as the search result.

* * * * *